(12) United States Patent  (10) Patent No.: US 9,062,972 B2
Acar et al.  (45) Date of Patent: Jun. 23, 2015

(54) MEMS MULTI-AXIS ACCELEROMETER ELECTRODE STRUCTURE

(75) Inventors: Cenk Acar, Irvine, CA (US); John Gardner Bloomsburgh, Oakland, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 351 days.

(21) Appl. No.: 13/362,955

(22) Filed: Jan. 31, 2012

(65) Prior Publication Data

US 2013/0192369 A1  Aug. 1, 2013

(51) Int. Cl.
*G01P 15/00* (2006.01)
*G01C 19/5712* (2012.01)
*G01P 15/125* (2006.01)
*G01P 15/18* (2013.01)
*G01P 15/08* (2006.01)

(52) U.S. Cl.
CPC .... *G01C 19/5712* (2013.01); *G01P 2015/0822* (2013.01); *G01P 15/125* (2013.01); *G01P 15/18* (2013.01)

(58) Field of Classification Search
CPC ............................ G01N 35/0099; G01N 35/04
USPC .......................................... 73/514.01, 514.02
See application file for complete search history.

(56) References Cited

U.S. PATENT DOCUMENTS

| 4,896,156 A | 1/1990 | Garverick |
| 5,487,305 A | 1/1996 | Ristic et al. |
| 5,491,604 A | 2/1996 | Nguyen et al. |
| 5,600,064 A | 2/1997 | Ward |
| 5,723,790 A | 3/1998 | Andersson |
| 5,751,154 A | 5/1998 | Tsugai |
| 5,760,465 A | 6/1998 | Alcoe et al. |
| 5,765,046 A | 6/1998 | Watanabe et al. |
| 6,131,457 A | 10/2000 | Sato |

(Continued)

FOREIGN PATENT DOCUMENTS

| CN | 1389704 A | 1/2003 |
| CN | 1617334 A | 5/2005 |

(Continued)

OTHER PUBLICATIONS

"Application Serial No. PCT/US2011/052006, International Republished Application mailed Jun. 7, 2012", 1 pg.

(Continued)

*Primary Examiner* — Hezron E Williams
*Assistant Examiner* — Mark A Shabman
(74) *Attorney, Agent, or Firm* — Schwegman Lundberg & Woessner, P.A.

(57) ABSTRACT

This document discusses, among other things, an inertial sensor including a single proof-mass formed in an x-y plane of a device layer, the single proof-mass including a single, central anchor configured to suspend the single proof-mass above a via wafer. The inertial sensor further includes first and second electrode stator frames formed in the x-y plane of the device layer on respective first and second sides of the inertial sensor, the first and second electrode stator frames symmetric about the single, central anchor, and each separately including a central platform and an anchor configured to fix the central platform to the via wafer, wherein the anchors for the first and second electrode stator frames are asymmetric along the central platforms with respect to the single, central anchor.

17 Claims, 15 Drawing Sheets

(56) References Cited

U.S. PATENT DOCUMENTS

| | | |
|---|---|---|
| 6,214,644 B1 | 4/2001 | Glenn |
| 6,301,965 B1 | 10/2001 | Chu et al. |
| 6,351,996 B1 | 3/2002 | Nasiri et al. |
| 6,366,468 B1 | 4/2002 | Pan |
| 6,390,905 B1 | 5/2002 | Korovin et al. |
| 6,501,282 B1 | 12/2002 | Dummermuth et al. |
| 6,504,385 B2 | 1/2003 | Hartwell |
| 6,553,835 B1 | 4/2003 | Hobbs et al. |
| 6,722,206 B2 | 4/2004 | Takada |
| 6,725,719 B2 | 4/2004 | Cardarelli |
| 6,781,231 B2 | 8/2004 | Minervini et al. |
| 6,848,304 B2 | 2/2005 | Geen |
| 7,051,590 B1 | 5/2006 | Lemkin et al. |
| 7,054,778 B2 | 5/2006 | Geiger et al. |
| 7,093,487 B2 | 8/2006 | Mochida |
| 7,166,910 B2 | 1/2007 | Minervini et al. |
| 7,202,552 B2 | 4/2007 | Zhe et al. |
| 7,210,351 B2 | 5/2007 | Lo et al. |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,266,349 B2 | 9/2007 | Kappes |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,358,151 B2 | 4/2008 | Araki et al. |
| 7,436,054 B2 | 10/2008 | Zhe |
| 7,449,355 B2 | 11/2008 | Lutz et al. |
| 7,451,647 B2 | 11/2008 | Matsuhisa et al. |
| 7,454,967 B2 | 11/2008 | Skurnik |
| 7,518,493 B2 | 4/2009 | Bryzek et al. |
| 7,539,003 B2 | 5/2009 | Ray et al. |
| 7,595,648 B2 | 9/2009 | Ungaretti et al. |
| 7,600,428 B2 * | 10/2009 | Robert et al. ............... 73/514.32 |
| 7,616,078 B2 | 11/2009 | Prandi et al. |
| 7,622,782 B2 | 11/2009 | Chu et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,851,925 B2 | 12/2010 | Theuss et al. |
| 7,859,352 B2 | 12/2010 | Sutton |
| 7,950,281 B2 | 5/2011 | Hammerschmidt |
| 8,004,354 B1 | 8/2011 | Pu et al. |
| 8,006,557 B2 | 8/2011 | Yin et al. |
| 8,037,755 B2 | 10/2011 | Nagata et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,375,789 B2 | 2/2013 | Prandi et al. |
| 8,421,168 B2 | 4/2013 | Howard et al. |
| 8,476,970 B2 | 7/2013 | Mokhtar et al. |
| 8,508,290 B2 | 8/2013 | Elsayed et al. |
| 8,710,599 B2 | 4/2014 | Marx et al. |
| 8,739,626 B2 | 6/2014 | Acar |
| 8,742,964 B2 | 6/2014 | Kleks et al. |
| 8,754,694 B2 | 6/2014 | Opris et al. |
| 8,813,564 B2 | 8/2014 | Acar |
| 2002/0021059 A1 | 2/2002 | Knowles et al. |
| 2002/0117728 A1 | 8/2002 | Brosnihhan et al. |
| 2002/0178831 A1 | 12/2002 | Takada |
| 2002/0189352 A1 * | 12/2002 | Reeds et al. ............... 73/504.04 |
| 2002/0196445 A1 | 12/2002 | Mcclary et al. |
| 2003/0038415 A1 | 2/2003 | Anderson et al. |
| 2003/0061878 A1 | 4/2003 | Pinson |
| 2003/0200807 A1 | 10/2003 | Hulsing, II |
| 2003/0222337 A1 | 12/2003 | Stewart |
| 2004/0085784 A1 | 5/2004 | Salama et al. |
| 2004/0119137 A1 | 6/2004 | Leonardi et al. |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matsuhisa |
| 2005/0005698 A1 | 1/2005 | McNeil et al. |
| 2005/0097957 A1 * | 5/2005 | McNeil et al. ............. 73/514.01 |
| 2005/0139005 A1 | 6/2005 | Geen |
| 2005/0189635 A1 | 9/2005 | Humpston et al. |
| 2005/0274181 A1 | 12/2005 | Kutsuna et al. |
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0097331 A1 | 5/2006 | Hattori |
| 2006/0137457 A1 | 6/2006 | Zdeblick |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2007/0013052 A1 | 1/2007 | Zhe et al. |
| 2007/0034005 A1 | 2/2007 | Acar et al. |
| 2007/0040231 A1 | 2/2007 | Harney et al. |
| 2007/0047744 A1 | 3/2007 | Karney et al. |
| 2007/0071268 A1 | 3/2007 | Harney et al. |
| 2007/0085544 A1 | 4/2007 | Viswanathan |
| 2007/0099327 A1 | 5/2007 | Hartzell et al. |
| 2007/0114643 A1 | 5/2007 | DCamp et al. |
| 2007/0165888 A1 | 7/2007 | Weigold |
| 2007/0205492 A1 | 9/2007 | Wang |
| 2007/0220973 A1 | 9/2007 | Acar |
| 2007/0222021 A1 | 9/2007 | Yao |
| 2007/0284682 A1 | 12/2007 | Laming et al. |
| 2008/0049230 A1 | 2/2008 | Chin et al. |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0122439 A1 | 5/2008 | Burdick et al. |
| 2008/0157238 A1 | 7/2008 | Hsiao |
| 2008/0157301 A1 | 7/2008 | Ramakrishna et al. |
| 2008/0169811 A1 | 7/2008 | Viswanathan |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0290756 A1 | 11/2008 | Huang |
| 2008/0302559 A1 | 12/2008 | Leedy |
| 2008/0314147 A1 | 12/2008 | Nasiri |
| 2009/0064780 A1 | 3/2009 | Coronato et al. |
| 2009/0072663 A1 | 3/2009 | Ayazi et al. |
| 2009/0140606 A1 | 6/2009 | Huang |
| 2009/0166827 A1 | 7/2009 | Foster et al. |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0263937 A1 | 10/2009 | Ramakrishna et al. |
| 2009/0266163 A1 | 10/2009 | Ohuchi et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0058864 A1 * | 3/2010 | Hsu et al. .................. 73/514.32 |
| 2010/0072626 A1 | 3/2010 | Theuss et al. |
| 2010/0089154 A1 * | 4/2010 | Ballas et al. ................... 73/493 |
| 2010/0122577 A1 | 5/2010 | Hsu et al. |
| 2010/0155863 A1 | 6/2010 | Weekamp |
| 2010/0206074 A1 | 8/2010 | Yoshida et al. |
| 2010/0212425 A1 | 8/2010 | Hsu et al. |
| 2010/0224004 A1 | 9/2010 | Suminto et al. |
| 2010/0236327 A1 | 9/2010 | Mao et al. |
| 2011/0030473 A1 * | 2/2011 | Acar ........................ 73/504.12 |
| 2011/0030474 A1 | 2/2011 | Kuang et al. |
| 2011/0031565 A1 | 2/2011 | Marx et al. |
| 2011/0094302 A1 * | 4/2011 | Schofield et al. .......... 73/504.12 |
| 2011/0120221 A1 | 5/2011 | Yoda |
| 2011/0121413 A1 | 5/2011 | Allen et al. |
| 2011/0146403 A1 | 6/2011 | Rizzo Piazza Roncoroni et al. |
| 2011/0265564 A1 | 11/2011 | Acar et al. |
| 2011/0285445 A1 | 11/2011 | Huang et al. |
| 2013/0139591 A1 | 6/2013 | Acar |
| 2013/0139592 A1 | 6/2013 | Acar |
| 2013/0192364 A1 | 8/2013 | Acar |

(56) References Cited

U.S. PATENT DOCUMENTS

| | | |
|---|---|---|
| 2013/0247666 A1 | 9/2013 | Acar |
| 2013/0247668 A1 | 9/2013 | Bryzek |
| 2013/0250532 A1 | 9/2013 | Bryzek et al. |
| 2013/0257487 A1 | 10/2013 | Opris et al. |
| 2013/0263641 A1 | 10/2013 | Opris et al. |
| 2013/0263665 A1 | 10/2013 | Opris et al. |
| 2013/0265070 A1 | 10/2013 | Kleks et al. |
| 2013/0265183 A1 | 10/2013 | Kleks et al. |
| 2013/0268227 A1 | 10/2013 | Opris et al. |
| 2013/0268228 A1 | 10/2013 | Opris et al. |
| 2013/0269413 A1 | 10/2013 | Tao et al. |
| 2013/0270657 A1 | 10/2013 | Acar et al. |
| 2013/0270660 A1 | 10/2013 | Bryzek et al. |
| 2013/0271228 A1 | 10/2013 | Tao et al. |
| 2013/0277772 A1 | 10/2013 | Bryzek et al. |
| 2013/0277773 A1 | 10/2013 | Bryzek et al. |
| 2013/0298671 A1 | 11/2013 | Acar et al. |
| 2013/0328139 A1 | 12/2013 | Acar |
| 2013/0341737 A1 | 12/2013 | Bryzek et al. |
| 2014/0070339 A1 | 3/2014 | Marx |

FOREIGN PATENT DOCUMENTS

| | | |
|---|---|---|
| CN | 1659810 A | 8/2005 |
| CN | 1816747 A | 8/2006 |
| CN | 1886669 A | 12/2006 |
| CN | 1905167 A | 1/2007 |
| CN | 1948906 A | 4/2007 |
| CN | 101038299 A | 9/2007 |
| CN | 101067555 A | 11/2007 |
| CN | 101171665 A | 4/2008 |
| CN | 101180516 A | 5/2008 |
| CN | 101239697 A | 8/2008 |
| CN | 101270988 A | 9/2008 |
| CN | 101316462 A | 12/2008 |
| CN | 101426718 A | 5/2009 |
| CN | 101459866 A | 6/2009 |
| CN | 101519183 A | 9/2009 |
| CN | 101638211 A | 2/2010 |
| CN | 101813480 A | 8/2010 |
| CN | 101858928 A | 10/2010 |
| CN | 102597699 A | 7/2012 |
| CN | 103209922 A | 7/2013 |
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| CN | 103363969 A | 10/2013 |
| CN | 103363983 A | 10/2013 |
| CN | 103364590 A | 10/2013 |
| CN | 103364593 A | 10/2013 |
| CN | 103368503 A | 10/2013 |
| CN | 103368562 A | 10/2013 |
| CN | 103368577 A | 10/2013 |
| CN | 103376099 A | 10/2013 |
| CN | 103376102 A | 10/2013 |
| CN | 103403495 A | 11/2013 |
| CN | 203275441 U | 11/2013 |
| CN | 203275442 U | 11/2013 |
| CN | 103663344 A | 3/2014 |
| CN | 203719664 U | 7/2014 |
| CN | 104094084 A | 10/2014 |
| CN | 104105945 A | 10/2014 |
| CN | 104220840 A | 12/2014 |
| DE | 112011103124 T5 | 12/2013 |
| DE | 102013014881 A1 | 3/2014 |
| EP | 1460380 A1 | 9/2004 |
| EP | 1521086 A1 | 4/2005 |
| EP | 1688705 A2 | 8/2006 |
| EP | 1832841 A1 | 9/2007 |
| EP | 1860402 A1 | 11/2007 |
| EP | 2053413 A1 | 4/2009 |
| EP | 2259019 A1 | 12/2010 |
| JP | 09089927 A | 4/1997 |
| JP | 10239347 A | 9/1998 |
| JP | 2005024310 A | 1/2005 |
| JP | 2005114394 A | 4/2005 |
| JP | 2005294462 A | 10/2005 |
| JP | 2007024864 A | 2/2007 |
| JP | 2008294455 A | 12/2008 |
| JP | 2009075097 A | 4/2009 |
| JP | 2009186213 A | 8/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 101311966 B1 | 9/2013 |
| KR | 1020130097209 A | 9/2013 |
| KR | 101318810 B1 | 10/2013 |
| KR | 1020130037462 A | 10/2013 |
| KR | 1020130112789 A | 10/2013 |
| KR | 1020130112792 A | 10/2013 |
| KR | 1020130112804 A | 10/2013 |
| KR | 1020130113385 A | 10/2013 |
| KR | 1020130113386 A | 10/2013 |
| KR | 1020130113391 A | 10/2013 |
| KR | 1020130116189 A | 10/2013 |
| KR | 1020130116212 A | 10/2013 |
| KR | 101332701 B1 | 11/2013 |
| KR | 1020130139914 A | 12/2013 |
| KR | 1020130142116 A | 12/2013 |
| KR | 101352827 B1 | 1/2014 |
| KR | 1020140034713 A | 3/2014 |
| TW | I255341 B | 5/2006 |
| WO | WO-0175455 A2 | 10/2001 |
| WO | WO-2008059757 A1 | 5/2008 |
| WO | WO-2008087578 A2 | 7/2008 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-201237537 A2 | 3/2012 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"Application Serial No. PCT/US2011/052417, International Republished Application mailed Jun. 7, 2012", 1 pg.

"International Application Serial No. PCT/US2011/051994, International Search Report mailed Apr. 16, 2012", 3 pgs.

"International Application Serial No. PCT/US2011/051994, Written Opinion mailed Apr. 16, 2012", 6 pgs.

"International Application Serial No. PCT/US2011/052006, Search Report mailed Apr. 16, 2012", 3 pgs.

"International Application Serial No. PCT/US2011/052006, Written Opinion mailed Apr. 16, 2012", 5 pgs.

(56) References Cited

OTHER PUBLICATIONS

"International Application Serial No. PCT/US2011/052059, Search Report mailed Apr. 20, 2012", 4 pgs.
"International Application Serial No. PCT/US2011/052059, Written Opinion mailed Apr. 20, 2012", 7 pgs.
"International Application Serial No. PCT/US2011/052060, International Search Report Apr. 20, 2012", 3 pgs.
"International Application Serial No. PCT/US2011/052060, Written Opinion mailed Apr. 20, 2012", 7 pgs.
"International Application Serial No. PCT/US2011/052061, International Search Report mailed Apr. 10, 2012", 3 pgs.
"International Application Serial No. PCT/US2011/052061, Written Opinion mailed Apr. 10, 2012", 4 pgs.
"International Application Serial No. PCT/US2011/052369, International Search Report mailed Apr. 24, 2012", 6 pgs.
"International Application Serial No. PCT/US2011/052369, Written Opinion mailed Apr. 24, 2012", 3 pgs.
"International Application Serial No. PCT/US2011/052417, International Search Report mailed Apr. 23, 2012", 5 pgs.
"International Application Serial No. PCT/US2011/052417, Written Opinion mailed Apr. 23, 2012", 4 pgs.
Beyne, E, et al., "Through-silicon via and die stacking technologies for microsystems-integration", IEEE International Electron Devices Meeting, 2008. IEDM 2008., (Dec. 2008), 1-4.
Cabruja, Enric, et al., "Piezoresistive Accelerometers for MCM-Package-Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.
Rimskog, Magnus, "Through Wafer Viw Technolog for MEMS and 3D Intergration", Electronic Manufacturing Tecnology Smposium, (Oct. 2007), pp. 286-289.
"U.S. Appl. No. 12/849,742, Notice of Allowance mailed Nov. 29, 2013", 7 pgs.
"U.S. Appl. No. 12/849,787, Notice of Allowance mailed Dec. 11, 2013", 9 pgs.
"U.S. Appl. No. 13/362,955, Response filed Feb. 17, 2014 to Restriction Requirement mailed Dec. 17, 2013", 9 pgs.
"U.S. Appl. No. 13/363,537, Non Final Office Action mailed Feb. 6, 2014", 10 pgs.
"U.S. Appl. No. 13/742,942, Notice of Allowance mailed Jan. 28, 2014", 9 pgs.
"U.S. Appl. No. 13/746,016, Notice of Allowance mailed Jan. 17, 2014", 10 pgs.
"U.S. Appl. No. 13/755,841, Restriction Requirement mailed Feb. 21, 2014", 6 pgs.
"Chinese Application Serial No. 201180053926.1, Office Action mailed Jan. 13, 2014", 7 pgs.
"Chinese Application Serial No. 201180054796.3, Office Action mailed Jan. 16, 2014", 8 pgs.
"Chinese Application Serial No. 201180055029.4, Office Action mailed Jan. 13, 2014", 7 pgs.
"Chinese Application Serial No. 201320172366.8, Office Action mailed Oct. 25, 2013", 8 pgs.
"Chinese Application Serial No. 201320172366.8, Response filed Dec. 24, 2013 to Office Action mailed Oct. 25, 2013", 11 pgs.
"Chinese Application Serial No. 201320565239.4, Office Action mailed Jan. 16, 2014", w/English Translation, 3 pgs.
"European Application Serial No. 10806751.3, Extended European Search Report mailed Jan. 7, 2014", 7 pgs.
"Korean Application Serial No. 10-2013-0109990, Amendment filed Dec. 10, 2013", 4 pgs.
"Korean Application Serial No. 10-2013-7009775, Office Action mailed Dec. 27, 2013", 8 pgs.
"Korean Application Serial No. 10-2013-7009775, Response filed Oct. 29, 2013 to Office Action mailed Sep. 17, 2013", w/English Claims, 23 pgs.
"Korean Application Serial No. 10-2013-7009777, Office Action mailed Jan. 27, 2014", 5 pgs.
"Korean Application Serial No. 10-2013-7009777, Response filed Nov. 5, 2013 to Office Action mailed Sep. 17, 2013", 11 pgs.
"Korean Application Serial No. 10-2013-7009788, Office Action mailed Dec. 27, 2013", w/English Translation, 10 pgs.
"Korean Application Serial No. 10-2013-7009788, Response filed Oct. 29, 2013 to Office Action mailed Aug. 29, 2013", w/English Claims, 22 pgs.
"International Application Serial No. PCT/US2010/002166, International Preliminary Report on Patentability mailed Feb. 16, 2012", 6 pgs.
"International Application Serial No. PCT/US2010/002166, International Search Report mailed Feb. 28, 2011", 3 pgs.
"International Application Serial No. PCT/US2010/002166, Written Opinion mailed Feb. 28, 2011", 4 pgs.
"International Application Serial No. PCT/US2011/052064, Search Report mailed Feb. 29, 2012", 3 pgs.
"International Application Serial No. PCT/US2011/052064, Written Opinion mailed Feb. 29, 2012", 3 pgs.
"International Application Serial No. PCT/US2011/052065, International Search Report mailed Apr. 10, 2012", 3 pgs.
"International Application Serial No. PCT/US2011/052065, Written Opinion mailed Apr. 10, 2012", 5 pgs.
"U.S. Appl. No. 12/849,742, Non Final Office Action mailed Mar. 28, 2013", 9 pgs.
"U.S. Appl. No. 12/849,742, Non Final Office Action mailed Aug. 23, 2012", 9 pgs.
"U.S. Appl. No. 12/849,742, Response filed Jan. 23, 2012 to Non Final Office Action mailed Aug. 23, 2012", 10 pgs.
"U.S. Appl. No. 12/849,787, Response filed Feb. 4, 2013 to Restriction Requirement mailed Oct. 4, 2012", 7 pgs.
"U.S. Appl. No. 12/849,787, Restriction Requirement mailed Oct. 4, 2012", 5 pgs.
"U.S. Appl. No. 13/813,443, Preliminary Amendment mailed Jan. 31, 2013", 3 pgs.
"U.S. Appl. No. 13/821,586, Preliminary Amendment mailed Mar. 8, 2013", 6 pgs.
"U.S. Appl. No. 13/821,589, Preliminary Amendment mailed Mar. 8, 2013", 6 pgs.
"U.S. Appl. No. 13/821,612, Preliminary Amendment mailed Mar. 8, 2013", 3 pgs.
"U.S. Appl. No. 13/821,793, Preliminary Amendment mailed Mar. 8, 2013", 3 pgs.
"U.S. Appl. No. 13/821,842, Preliminary Amendment mailed Mar. 8, 2013", 3 pgs.
"U.S. Appl. No. 13/821,853, Preliminary Amendment mailed Mar. 8, 2013", 3 pgs.
"International Application Serial No. PCT/US2011/052006, International Preliminary Report on Patentability mailed Mar. 28, 2013", 7 pgs.
"International Application Serial No. PCT/US2011/052059, International Preliminary Report on Patentability mailed Jan. 22, 2013", 14 pgs.
"International Application Serial No. PCT/US2011/052060, International Preliminary Report on Patentability mailed Jan. 22, 2013", 12 pgs.
"International Application Serial No. PCT/US2011/052061, International Preliminary Report on Patentability mailed Mar. 28, 2013", 6 pgs.
"International Application Serial No. PCT/US2011/052064, International Preliminary Report on Patentability mailed Mar. 28, 2013", 5 pgs.
"International Application Serial No. PCT/US2011/052065, International Preliminary Report on Patentability mailed Mar. 28, 2013", 7 pgs.
"International Application Serial No. PCT/US2011/052417, International Preliminary Report on Patentability mailed Apr. 4, 2013", 6 pgs.

(56) References Cited

OTHER PUBLICATIONS

"U.S. Appl. No. 12/849,742, Response filed Sep. 30, 2013 to Non-Final Office Action mailed Mar. 28, 2013", 12 pgs.
"U.S. Appl. No. 12/849,787, Response filed Oct. 28, 2013 to Non Final Office Action mailed May 28, 2013", 12 pgs.
"Chinese Application Serial No. 201180053926.1, Amendment filed Aug. 21, 2013", w/English Translation, 13 pgs.
"Chinese Application Serial No. 201180055309.5, Voluntary Amendment filed Aug. 23, 2013", w/English Translation, 13 pgs.
"Chinese Application Serial No. 201320165465.3, Office Action mailed Jul. 22, 2013", w/English Translation, 2 pgs.
"Chinese Application Serial No. 201320165465.3, Response filed Aug. 7, 2013 to Office Action mailed Jul. 22, 2013", w/English Translation, 39 pgs.
"Chinese Application Serial No. 201320171504.0, Office Action mailed Jul. 22, 2013", w/English Translation, 3 pgs.
"Chinese Application Serial No. 201320171504.0, Response filed Jul. 25, 2013 to Office Action mailed Jul. 22, 2013", w/English Translation, 33 pgs.
"Chinese Application Serial No. 201320171616.6, Office Action mailed Jul. 10, 2013", w/English Translation, 2 pgs.
"Chinese Application Serial No. 201320171757.8, Office Action mailed Jul. 11, 2013", w/English Translation, 2 pgs.
"Chinese Application Serial No. 201320171757.8, Response filed Jul. 25, 2013 to Office Action mailed Jul. 11, 2013", w/English Translation, 21 pgs.
"Chinese Application Serial No. 201320171757.8, Response filed Jul. 26, 2013 to Office Action mailed Jul. 10, 2013", w/English Translation, 40 pgs.
"Chinese Application Serial No. 201320172128.7, Office Action mailed Jul. 12, 2013", w/English Translation, 3 pgs.
"Chinese Application Serial No. 201320172128.7, Response filed Aug. 7, 2013 to Office Action mailed Jul. 12, 2013", w/English Translation, 39 pgs.
"Chinese Application Serial No. 201320172366.8, Office Action mailed Jul. 9, 2013", w/English Translation, 3 pgs.
"Chinese Application Serial No. 201320172366.8, Response filed Sep. 16, 2013 to Office Action mailed Jul. 9, 2013", w/English Translation, 24 pgs.
"Chinese Application Serial No. 201320172367.2, Office Action mailed Jul. 9, 2013", w/English Translation, 2 pgs.
"Chinese Application Serial No. 201320172367.2, Response filed Sep. 16, 2013 to Office Action mailed Jul. 9, 2013", w/English Translation, 24 pgs.
"Chinese Application Serial No. 201320185461.1, Office Action mailed Jul. 23, 2013", w/English Translation, 3 pgs.
"Chinese Application Serial No. 201320185461.1, Response filed Sep. 10, 2013 to Office Action mailed Jul. 23, 2013", w/English Translation, 25 pgs.
"Chinese Application Serial No. 201320186292.3, Office Action mailed Jul. 19, 2013", w/English Translation, 2 pgs.
"Chinese Application Serial No. 201320186292.3, Response filed Sep. 10, 2013 to Office Action mailed Jul. 19, 2013", w/English Translation, 23 pgs.
"European Application Serial No. 13001692.6, European Search Report mailed Jul. 24, 2013", 5 pgs.
"European Application Serial No. 13001696.7, Extended European Search Report mailed Aug. 6, 2013", 4 pgs.
"European Application Serial No. 13001721.3, European Search Report mailed Jul. 18, 2013", 9 pgs.
"International Application Serial No. PCT/US2013/024138, International Search Report mailed May 24, 2013", 3 pgs.
"International Application Serial No. PCT/US2013/024138, Written Opinion mailed May 24, 2013", 4 pgs.
"Korean Application Serial No. 10-2013-7009775, Office Action mailed Sep. 17, 2013", w/English Translation, 6 pgs.
"Korean Application Serial No. 10-2013-7009777, Office Action mailed Sep. 17, 2013", w/English Translation, 8 pgs.
"Korean Application Serial No. 10-2013-7009788, Office Action mailed Aug. 29, 2013", w/English Translation, 6 pgs.
"Korean Application Serial No. 10-2013-7009790, Office Action mailed Jun. 26, 2013", W/English Translation, 7 pgs.
"Korean Application Serial No. 10-2013-7009790, Response filed Aug. 26, 2013 to Office Action mailed Jun. 26, 2013", w/English Claims, 11 pgs.
"Korean Application Serial No. 10-2013-7010143, Office Action mailed May 28, 2013", w/English Translation, 5 pgs.
"Korean Application Serial No. 10-2013-7010143, Response filed Jul. 24, 2013 to Office Action mailed May 28, 2013", w/English Claims, 14 pgs.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf?...>, (Jan. 1, 2004), 123 pgs.
"U.S. Appl. No. 12/849,787, Non Final Office Action mailed May 28, 2013", 18 pgs.
"U.S. Appl. No. 12/947,543, Notice of Allowance mailed Dec. 17, 2012", 11 pgs.
"U.S. Appl. No. 13/821,598, Preliminary Amendment mailed Mar. 8, 2013", 7 pgs.
"U.S. Appl. No. 13/821,609, Preliminary Amendment mailed Mar. 8, 2013", 3 pgs.
"U.S. Appl. No. 13/821,619, Preliminary Amendment mailed Mar. 8, 2013", 3 pgs.
"Application Serial No. PCT/US2011/051994, International Republished Application mailed Jun. 7, 2012", 1 pg.
"DigiSiMic™ Digital Silicon Microphone Pulse Part No. TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability mailed Mar. 28, 2013", 8 pgs.
"International Application Serial No. PCT/US2011/052340, International Preliminary Report on Patentability mailed Apr. 4, 2013", 5 pgs.
"International Application Serial No. PCT/US2011/052340, Search Report mailed Feb. 29, 2012", 3 pgs.
"International Application Serial No. PCT/US2011/052340, Written Opinion mailed Feb. 29, 2012", 3 pgs.
"International Application Serial No. PCT/US2011/052369, International Preliminary Report on Patentability mailed Apr. 4, 2013", 5 pgs.
"International Application Serial No. PCT/US2013/021411, International Search Report mailed Apr. 30, 2013", 5 pgs.
"International Application Serial No. PCT/US2013/021411, Written Opinion mailed Apr. 30, 2013", 5 pgs.
"International Application Serial No. PCT/US2013/023877, International Search Report mailed May 14, 2013", 3 pgs.
"International Application Serial No. PCT/US2013/023877, Written Opinion mailed May 14, 2013", 5 pgs.
"International Application Serial No. PCT/US2013/024149, Written Opinion mailed", 4 pages.
"International Application Serial No. PCT/US2013/024149, International Search Report mailed", 7 pages.
"T4020 & T4030 MEMS Microphones for Consumer Electronics", Product Brief 2010, Edition Feb. 2010, 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.

(56) References Cited

OTHER PUBLICATIONS

Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair A look at some recent history of multi-chip and through silicon via (TSV) technology", Chip Design Magazine, (Oct./Nov. 2008), 7 pgs.
"U.S. Appl. No. 12/849,742, Supplemental Notice of Allowability mailed Mar. 17, 2014", 3 pgs.
"U.S. Appl. No. 12/849,742, Supplemental Notice of Allowability mailed May 5, 2014", 2 pgs.
"U.S. Appl. No. 12/849,787, Supplemental Notice of Allowability mailed Mar. 21, 2014", 3 pgs.
"U.S. Appl. No. 13/363,537, Final Office Action mailed Jun. 27, 2014", 8 pgs.
"U.S. Appl. No. 13/363,537, Response filed Jun. 6, 2014 to Non Final Office Action mailed Feb. 6, 2014", 11 pgs.
"U.S. Appl. No. 13/742,942, Notice of Allowance mailed Jan. 28, 2014", 8 pgs.
"U.S. Appl. No. 13/742,942, Supplemental Notice of Allowability mailed Apr. 10, 2014", 2 pgs.
"U.S. Appl. No. 13/755,841, Notice of Allowance mailed May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement mailed Feb. 21, 2014", 7 pgs.
"U.S. Appl. No. 13/755,841, Supplemental Notice of Allowability Jun. 27, 2014", 2 pgs.
"U.S. Appl. No. 13/821,589, Non Final Office Action mailed Jul. 9, 2014", 10 pgs.
"U.S. Appl. No. 13/821,589, Response to Restriction Requirement mailed Apr. 11, 2014", 6 pgs.
"U.S. Appl. No. 13/821,589, Restriction Requirement mailed Apr. 11, 2014", 10 pgs.
"U.S. Appl. No. 13/821,598, Restriction Requirement mailed Aug. 15, 2014", 11 pgs.
"U.S. Appl. No. 13/821,612, Non Final Office Action mailed Jul. 23, 2014", 8 pgs.
"U.S. Appl. No. 13/821,853, Non Final Office Action mailed Jul. 30, 2014", 10 pgs.
"U.S. Appl. No. 13/860,761, Non Final Office Action mailed Aug. 19, 2014", 13 pgs.
"Chinese Application Serial No. 2010800423190, Office Action mailed Mar. 26, 2014", 10 pgs.
"Chinese Application Serial No. 2010800423190, Response filed Aug. 11, 2014 to Office Action mailed Mar. 26, 2014", w/English Claims, 11 pgs.
"Chinese Application Serial No. 201180053926.1, Response filed Apr. 29, 2014 to Office Action mailed Jan. 13, 2014", w/English Claims, 10 pgs.
"Chinese Application Serial No. 201180054796.3, Response filed Jun. 30, 2014 to Office Action mailed Jan. 16, 2014", w/English Claims, 3 pgs.
"Chinese Application Serial No. 201180055029.4, Office Action mailed Jul. 2, 2014", w/English Translation, 5 pgs.
"Chinese Application Serial No. 201180055029.4, Response filed May 27, 2014 to Office Action mailed Jan. 13, 2014", w/English Claims, 29 pgs.
"Chinese Application Serial No. 201180055309.5, Office Action mailed Mar. 31, 2014", w/English Claims, 7 pgs.
"Chinese Application Serial No. 201180055309.5, Response filed Aug. 13, 2014 to Office Action mailed Mar. 31, 2014", w/English Claims, 27 pgs.
"Chinese Application Serial No. 201320172366.8, Office Action mailed Jan. 30, 2014", w/English Claims, 3 pgs.
"Chinese Application Serial No. 201320172366.8, Response filed Mar. 18, 2014 to Office Action mailed Jan. 30, 2014", w/English Claims, 20 pgs.
"Chinese Application Serial No. 201320565239.4, Response filed Mar. 31, 2014 to Office Action mailed Jan. 16, 2014", w/English Claims, 38 pgs.
"Chinese Application Serial No. 201380007588.7, Notification to Make Rectification mailed Aug. 18, 2014", 2 pgs.
"Chinese Application Serial No. 201380007615.0, Notification to Make Rectification mailed Aug. 18, 2014", 2 pgs.
"European Application Serial No. 10806751.3, Response filed Jul. 24, 2014 to Office Action mailed Jan. 24, 2014", 26 pgs.
"European Application Serial No. 118260070.2, Office Action mailed Mar. 12, 2014", 1 pg.
"European Application Serial No. 11826068.6, Extended European Search Report mailed Jul. 16, 2014", 10 pgs.
"European Application Serial No. 11826070.2, Extended European Search Report mailed Feb. 21, 2014", 5 pgs.
"European Application Serial No. 11826071.0, Extended European Search Report mailed Feb. 20, 2014", 6 pgs.
"European Application Serial No. 11826071.0, Office Action mailed Mar. 12, 2014", 1 pg.
"European Application Serial No. 13001692.6, Response filed Apr. 1, 2014 to Extended European Search Report mailed Jul. 24, 2013", 19 pgs.
"European Application Serial No. 13001719.7, Extended European Search Report mailed Jun. 24, 2014", 10 pgs.
"European Application Serial No. 13001721.3, Response filed Apr. 7, 2014 to Extended European Search Report mailed Jul. 18, 2013", 25 pgs.
"International Application Serial No. PCT/US2013/021411, International Preliminary Report on Patentability mailed Aug. 14, 2014", 7 pgs.
"International Application Serial No. PCT/US2013/023877, International Preliminary Report on Patentability mailed Aug. 14, 2014", 7 pgs.
"International Application Serial No. PCT/US2013/024138, International Preliminary Report on Patentability mailed Aug. 14, 2014", 6 pgs.
"International Application Serial No. PCT/US2013/024149, International Preliminary Report on Patentability mailed Aug. 14, 2014", 6 pgs.
"Korean Application Serial No. 10-2013-7009777, Response filed Apr. 28, 2014", w/English Claims, 19 pgs.
Xia, Guo-Ming, et al., "Phase correction in digital self-oscillation drive circuit for improve silicon MEMS gyroscope bias stability", Solid-State and Integrated Circuit Technology (ICSICT), 2010 10th IEEE International Conference on, IEEE, (Nov. 1, 2010), 1416-1418.
"Chinese Application Serial No. 2010800423190, Office Action mailed Dec. 3, 2014", 3 pgs.
"Chinese Application Serial No. 201180054796.3, Response filed Nov. 19, 2014 to Office Action mailed Sep. 4, 2014", with English translation of claims, 7 pgs.
"Chinese Application Serial No. 201180055029.4, Response filed Nov. 14, 2014 to Office Action mailed Jul. 2, 2014", w/English Claims, 23 pgs.
"Chinese Application Serial No. 201180055630.3, Office Action mailed Dec. 22, 2014", 10 pgs.
"Chinese Application Serial No. 201180055792.7, Office Action mailed Dec. 22, 2014", 10 pgs.
"Chinese Application Serial No. 201180055794.6, Office Action mailed Dec. 17, 2014", with English translation of claims, 9 pgs.
"Chinese Application Serial No. 201380007588.7, Response filed Oct. 24, 2014", with English translation, 3 pgs.
"Chinese Application Serial No. 201380007615.0, Response filed Oct. 24, 2014", with English translation, 3 pgs.

(56) References Cited

OTHER PUBLICATIONS

"European Application Serial No. 11826071.0, Examination Notification Art. 94(3) mailed Dec. 11, 2014", 4 pgs.
"European Application Serial No. 11827384.6, Extended European Search Report mailed Nov. 12, 2014", 6 pgs.
"U.S. Appl. No. 13/363,537, Notice of Allowance mailed Nov. 7, 2014", 5 pgs.
"U.S. Appl. No. 13/821,586, Non Final Office Action mailed Jan. 15, 2015", 8 pgs.
"U.S. Appl. No. 13/821,586, Response filed Nov. 24, 2014 to Restriction Requirement mailed Sep. 22, 2014", 6 pgs.
"U.S. Appl. No. 13/821,589, Response filed Nov. 10, 2014 to Non Final Office Action mailed Jul. 9, 2014", 15 pgs.
"U.S. Appl. No. 13/821,598, Non Final Office Action mailed Nov. 20, 2014", 9 pgs.
"U.S. Appl. No. 13/821,609, Restriction Requirement mailed Dec. 15, 2014", 7 pgs.
"U.S. Appl. No. 13/821,612, Notice of Allowance mailed Dec. 10, 2014", 8 pgs.
"U.S. Appl. No. 13/821,612, Response filed Oct. 23, 2014 to Non Final Office Action mailed Jul. 23, 2014", 6 pgs.
"U.S. Appl. No. 13/821,853, Response filed Dec. 1, 2014 to Non Final Office Action mailed Jul. 30, 2014", 10 pgs.
"U.S. Appl. No. 13/860,761, Final Office Action mailed Jan. 15, 2015", 14 pgs.
"U.S. Appl. No. 13/860,761, Response filed Dec. 19, 2014 to Non Final Office Action mailed Aug. 19, 2014", 12 pgs.
"U.S. Appl. No. 13/363,537, Examiner Interview Summary mailed Sep. 29, 2014", 3 pgs.
"U.S. Appl. No. 13/363,537, Response filed Sep. 29, 2014 to Final Office Action mailed Jun. 27, 2014", 9 pgs.
"U.S. Appl. No. 13/821,586, Restriction Requirement mailed Sep. 22, 2014", 4 pgs.
"U.S. Appl. No. 13/821,598, Response filed Oct. 15, 2014 to Restriction Requirement mailed Aug. 15, 2014", 8 pgs.
"Chinese Application Serial No. 201180054796.3, Office Action mailed Sep. 4, 2014", w/English Claims, 11 pgs.
"Chinese Application Serial No. 201310118845.6, Office Action mailed Sep. 9, 2014", with English translation of claims, 8 pgs.
"Chinese Application Serial No. 201310119472.4, Office Action mailed Sep. 9, 2014", w/English Translation, 11 pgs.
"European Application Serial No. 11826043.9, Office Action mailed May 6, 2013", 2 pgs.
"European Application Serial No. 11826043.9, Response filed Nov. 4, 2013 to Office Action mailed May 6, 2013", 6 pgs.
"European Application Serial No. 11826067.8, Extended European Search Report mailed Oct. 6, 2014", 10 pgs.
"European Application Serial No. 11826070.2, Response filed Sep. 19, 2014 to Office Action mailed Mar. 12, 2014", 11 pgs.
"European Application Serial No. 11826071.0, Response filed Sep. 19, 2014 to Office Action mailed Mar. 12, 2014", 20 pgs.
"European Application Serial No. 11827347.3, Office Action mailed May 2, 2013", 6 pgs.
"European Application Serial No. 11827347.3, Response filed Oct. 30, 2013 to Office Action mailed May 2, 2013", 9 pgs.
"European Application Serial No. 13001695.9, European Search Report mailed Oct. 5, 2014", 6 pgs.
Dunn, C, et al., "Efficient linearisation of sigma-delta modulators using single-bit dither", Electronics Letters 31(12), (Jun. 1995), 941-942.
Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.
Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.

* cited by examiner

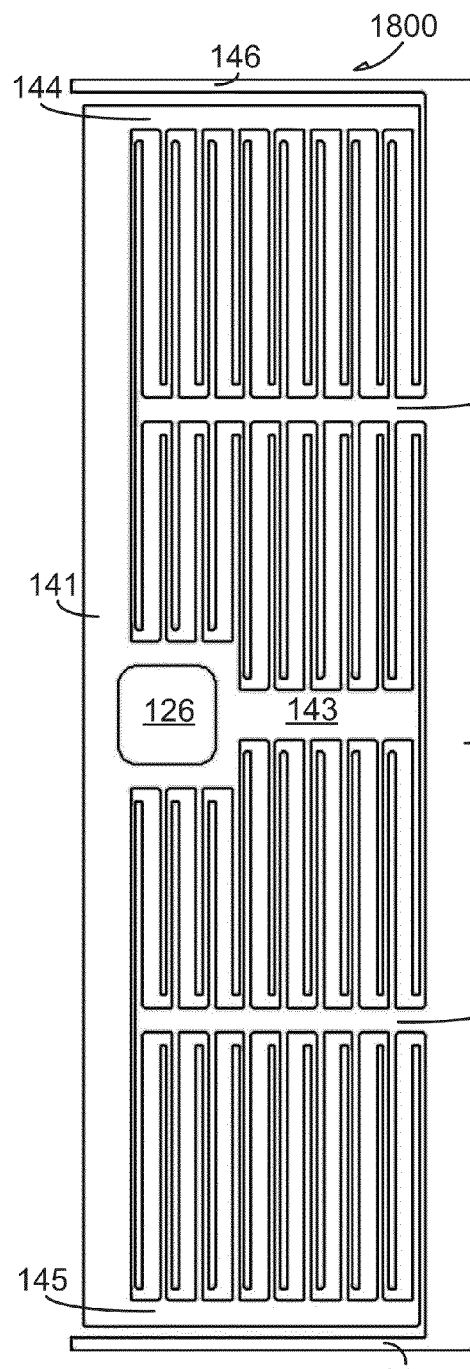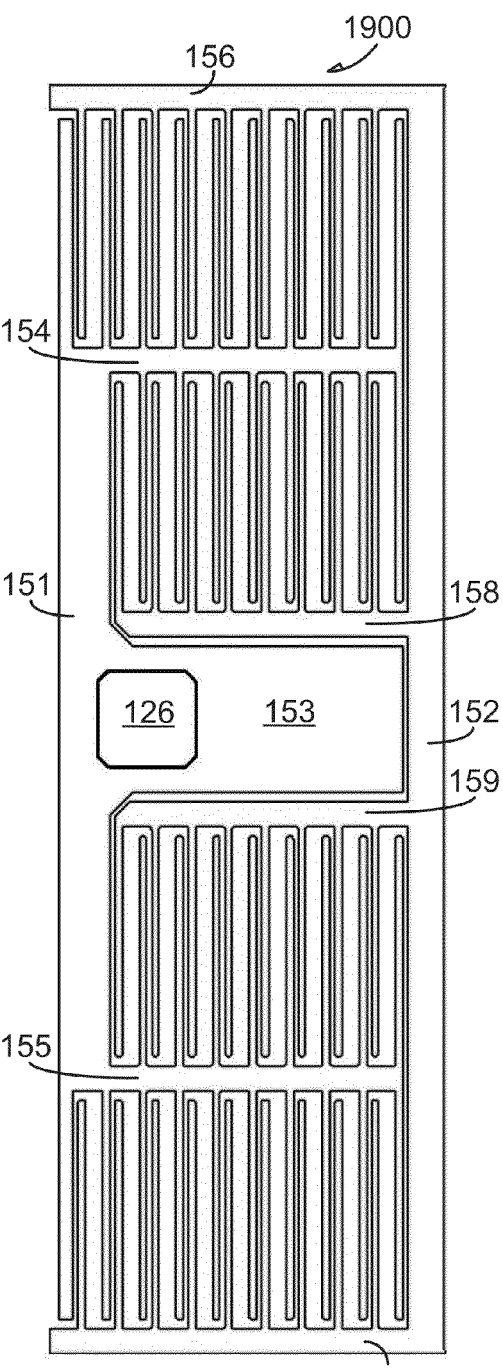
FIG. 18
FIG. 19

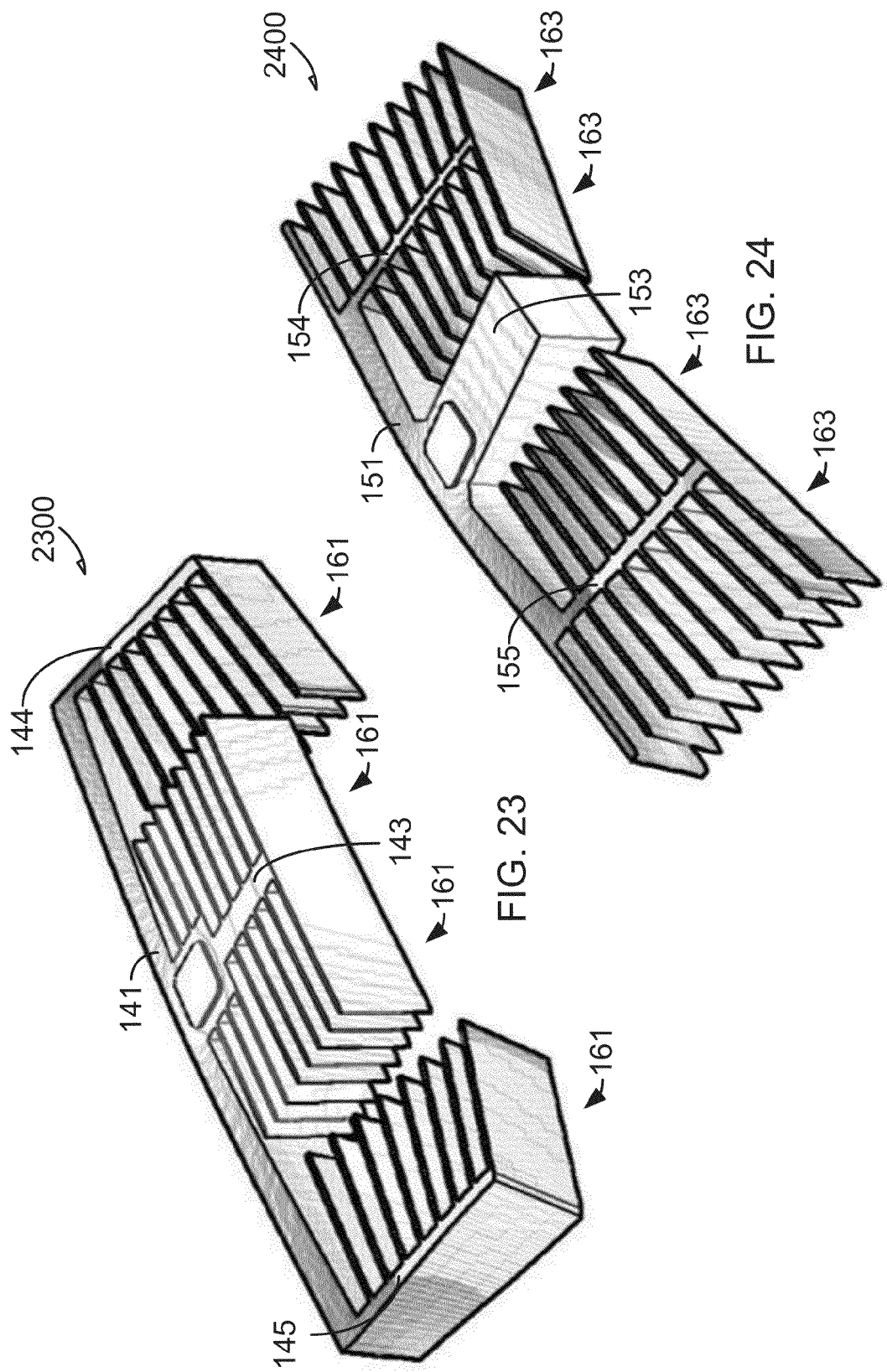

US 9,062,972 B2

MEMS MULTI-AXIS ACCELEROMETER ELECTRODE STRUCTURE

CROSS REFERENCE TO RELATED APPLICATIONS

This application is related to Acar, International Application No. PCT/US2011/052065, entitled "MICROMACHINED MONOLITHIC 3-AXIS GYROSCOPE WITH SINGLE DRIVE," filed on Sep. 18, 2011, which claims the benefit of priority to Acar, U.S. Provisional Patent Application Ser. No. 61/384,245, entitled "MICROMACHINED MONOLITHIC 3-AXIS GYROSCOPE WITH SINGLE DRIVE," filed on Sep. 18, 2010, and to Acar, International Application No. PCT/US2011/052064, entitled "MICROMACHINED 3-AXIS ACCELEROMETER WITH A SINGLE PROOF-MASS," filed on Sep. 18, 2011, which claims the benefit of priority of Acar, U.S. Provisional Patent Application Ser. No. 61/384,246, entitled "MICROMACHINED 3-AXIS ACCELEROMETER WITH A SINGLE PROOF-MASS," filed on Sep. 18, 2010, each of which is hereby incorporated by reference herein in its entirety.

Further, this application is related to Acar et al., U.S. patent application Ser. No. 12/849,742, entitled "MICROMACHINED INERTIAL SENSOR DEVICES," filed on Aug. 3, 2010 and to Marx et al., U.S. patent application Ser. No. 12/849,787, entitled "MICROMACHINED DEVICES AND FABRICATING THE SAME," filed Aug. 3, 2010, each of which is hereby incorporated by reference herein in its entirety.

BACKGROUND

Several single-axis or multi-axis micromachined gyroscope structures have been integrated into a system to form a 3-axis gyroscope cluster. However, the size and cost of such clusters consisting of separate sensors can be excessive for certain applications. Even though single or multi-axis gyroscopes can be fabricated on a single MEMS chip, separate drive and sense electronics are required for each sensor. Further, the demand for three axis acceleration detection in consumer/mobile, automotive and aerospace/defense applications is constantly increasing. Many single-axis or multi-axis micromachined accelerometer structures have utilized separate proof-masses for each acceleration axis.

OVERVIEW

This document discusses, among other things, an inertial sensor including a single proof-mass formed in an x-y plane of a device layer, the single proof-mass including a single, central anchor configured to suspend the single proof-mass above a via wafer. The inertial sensor further includes first and second electrode stator frames formed in the x-y plane of the device layer on respective first and second sides of the inertial sensor, the first and second electrode stator frames symmetric about the single, central anchor, and each separately including a central platform and an anchor configured to fix the central platform to the via wafer, wherein the anchors for the first and second electrode stator frames are asymmetric along the central platforms with respect to the single, central anchor.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 18-22 illustrate generally examples of an accelerometer electrode structures.

FIGS. 23 and 24 illustrate generally examples of the lowest out-of-plane resonant mode of electrode stator frames.

DETAILED DESCRIPTION

The present inventors have recognized, among other things, a micromachined monolithic 3-axis gyroscope configured to utilize a single center-anchored proof-mass to detect angular rate about all three axes while effectively decoupling the response modes for each axis to minimize cross-axis sensitivity.

In an example, the unique proof-mass partitioning and flexure structure disclosed herein can allow 3-axis angular rate detection utilizing a single drive-mode oscillation, which can require only one drive control loop for all axes. Thus, in contrast to existing multi-axis gyroscopes that use three separate drive loops, complexity and cost of control electronics of the 3-axis gyroscope disclosed herein can be significantly reduced.

Further, the present inventors have recognized, among other things, a micromachined 3-axis accelerometer configured to utilize a single center-anchored proof-mass to detect accelerations about all three axes while effectively decoupling the response modes for each axis to minimize cross-axis sensitivity.

In an example, the unique proof-mass and flexure structure disclosed herein can allow 3-axis acceleration detection using a single center anchored proof-mass. Thus, in contrast to existing multi-axis accelerometers that utilize separate proof-masses for each acceleration axis, the overall die size and the total cost of the microelectromechanical system (MEMS) sensing element of the 3-axis accelerometer disclosed herein can be significantly reduced.

Further, as die deformation and packaging stress affect the temperature coefficients of the MEMS sensors, and further, as one or more of the sensors disclosed herein may not be centered on the die, the present inventors have recognized, among other things, that shifting mass from an electrode stator frame to a proof mass frame can positively affect performance (e.g., more robust, improved shock and vibration resistance, etc.). Moreover, widening the anchor platform of the electrode stator frame can allow for independent or asymmetric placement of the electrode stator frame anchors, which can, among other things, improve temperature performance of the inertial sensor.

Device Structure

Figure 1:
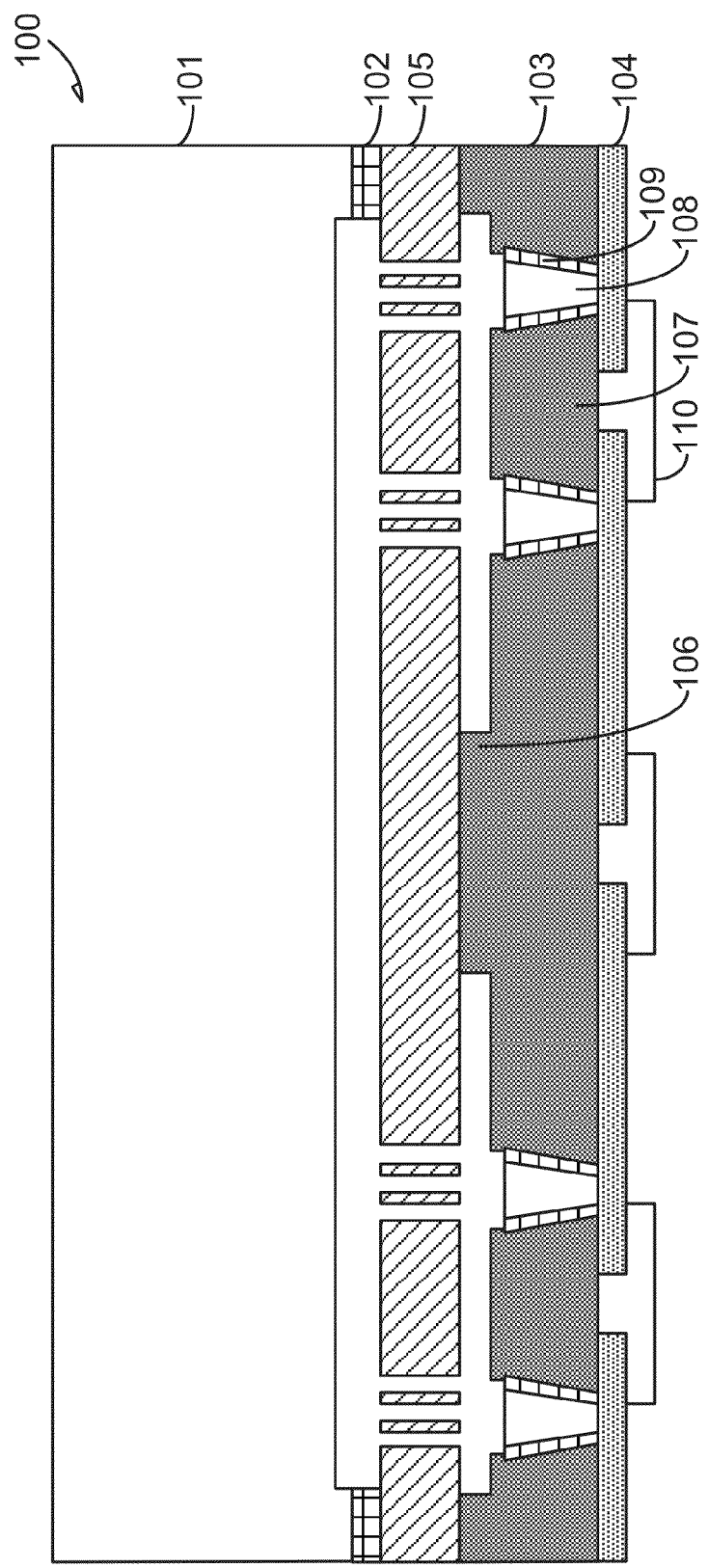
FIG. 1 illustrates generally a schematic cross sectional view of a 3-degrees-of-freedom (3-DOF) inertial measurement unit (IMU).

FIG. 1 illustrates generally a schematic cross sectional view of a 3-degrees-of-freedom (3-DOF) inertial measurement unit (IMU) 100, such as a 3-DOF gyroscope or a 3-DOF micromachined accelerometer, formed in a chip-scale package including a cap wafer 101, a device layer 105 including micromachined structures (e.g., a micromachined 3-DOF IMU), and a via wafer 103. In an example, the device layer 105 can be sandwiched between the cap wafer 101 and the via wafer 103, and the cavity between the device layer 105 and the cap wafer 101 can be sealed under vacuum at the wafer level.

In an example, the cap wafer 101 can be bonded to the device layer 105, such as using a metal bond 102. The metal bond 102 can include a fusion bond, such as a non-high temperature fusion bond, to allow getter to maintain long term vacuum and application of anti-stiction coating to prevent stiction that can occur to low-g acceleration sensors. In an example, during operation of the device layer 105, the metal bond 102 can generate thermal stress between the cap wafer 101 and the device layer 105. In certain examples, one or more features can be added to the device layer 105 to isolate the micromachined structures in the device layer 105 from thermal stress, such as one or more stress reducing grooves formed around the perimeter of the micromachined structures. In an example, the via wafer 103 can be bonded to the device layer 105, such as fusion bonded (e.g., silicon-silicon fusion bonded, etc.), to obviate thermal stress between the via wafer 103 and the device layer 105.

In an example, the via wafer 103 can include one or more isolated regions, such as a first isolated region 107, isolated from one or more other regions of the via wafer 103, for example, using one or more through-silicon-vias (TSVs), such as a first TSV 108 insulated from the via wafer 103 using a dielectric material 109. In certain examples, the one or more isolated regions can be utilized as electrodes to sense or actuate out-of-plane operation modes of the 6-axis inertial sensor, and the one or more TSVs can be configured to provide electrical connections from the device layer 105 outside of the system 100. Further, the via wafer 103 can include one or more contacts, such as a first contact 110, selectively isolated from one or more portions of the via wafer 103 using a dielectric layer 104 and configured to provide an electrical connection between one or more of the isolated regions or TSVs of the via wafer 103 to one or more external components, such as an ASIC wafer, using bumps, wire bonds, or one or more other electrical connection. In certain examples, the 3-degrees-of-freedom (3-DOF) gyroscope or the micromachined accelerometer in the device layer 105 can be supported or anchored to the via wafer 103 by bonding the device layer 105 to a protruding portion of the via wafer 103, such as an anchor 106. In an example, the anchor 106 can be located substantially at the center of the via wafer 103, and the device layer 105 can be fusion bonded to the anchor 106, such as to eliminate problems associated with metal fatigue.

Gyroscope Device Structure

Figure 2:
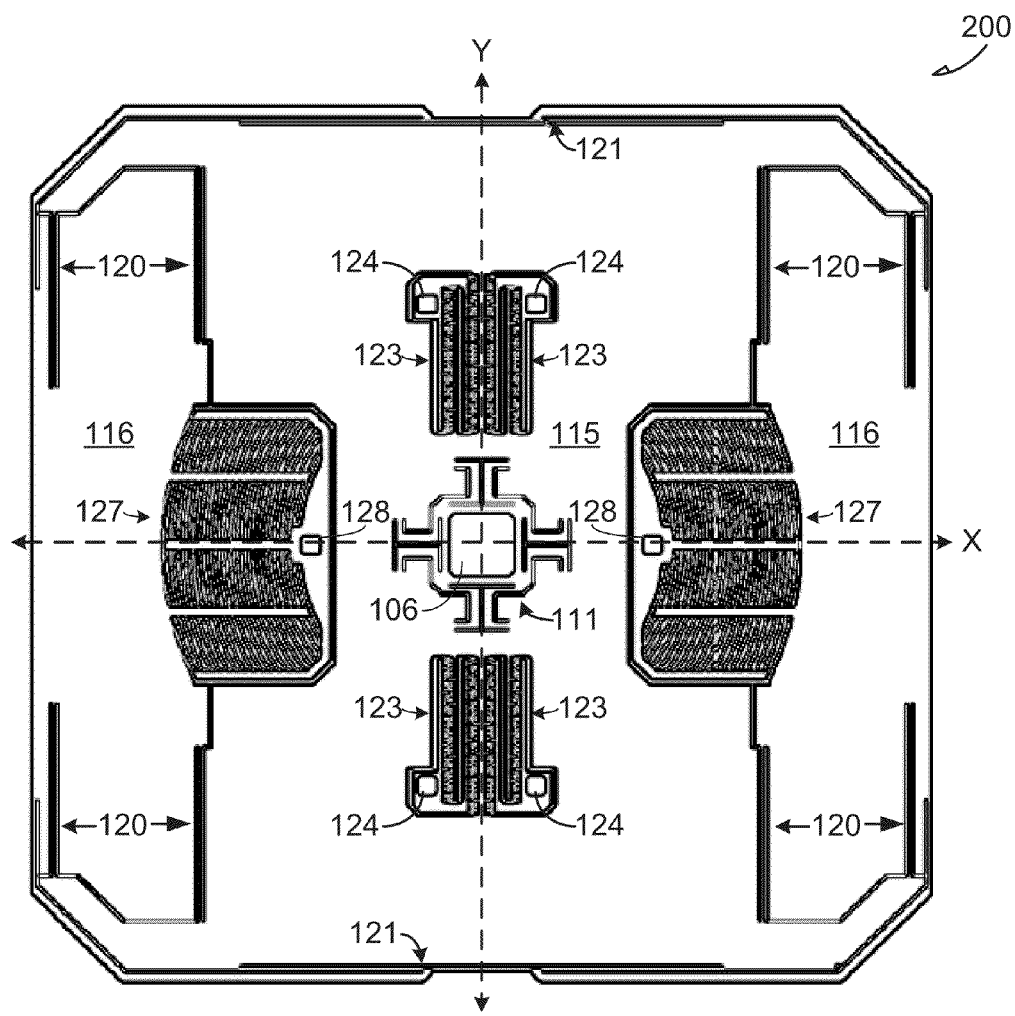
FIG. 2 illustrates generally an example of a 3-axis gyroscope.

FIG. 2 illustrates generally an example of a 3-axis gyroscope 200, such as formed in a single plane of a device layer 105 of a 3-DOF IMU 100. In an example, the structure of the 3-axis gyroscope 200 can be symmetric about the x and y axes illustrated in FIG. 2, with a z-axis conceptually coming out of the figure. Reference in FIG. 2 is made to structure and features in one portion of the 3-axis gyroscope 200. However, in certain examples, such reference and description can apply to unlabeled like portions of the 3-axis gyroscope 200.

In an example, the 3-axis gyroscope 200 can include a single proof-mass design providing 3-axis gyroscope operational modes patterned into the device layer 105 of the 3-DOF IMU 100, such as illustrated in the example of FIG. 1.

Figure 3:
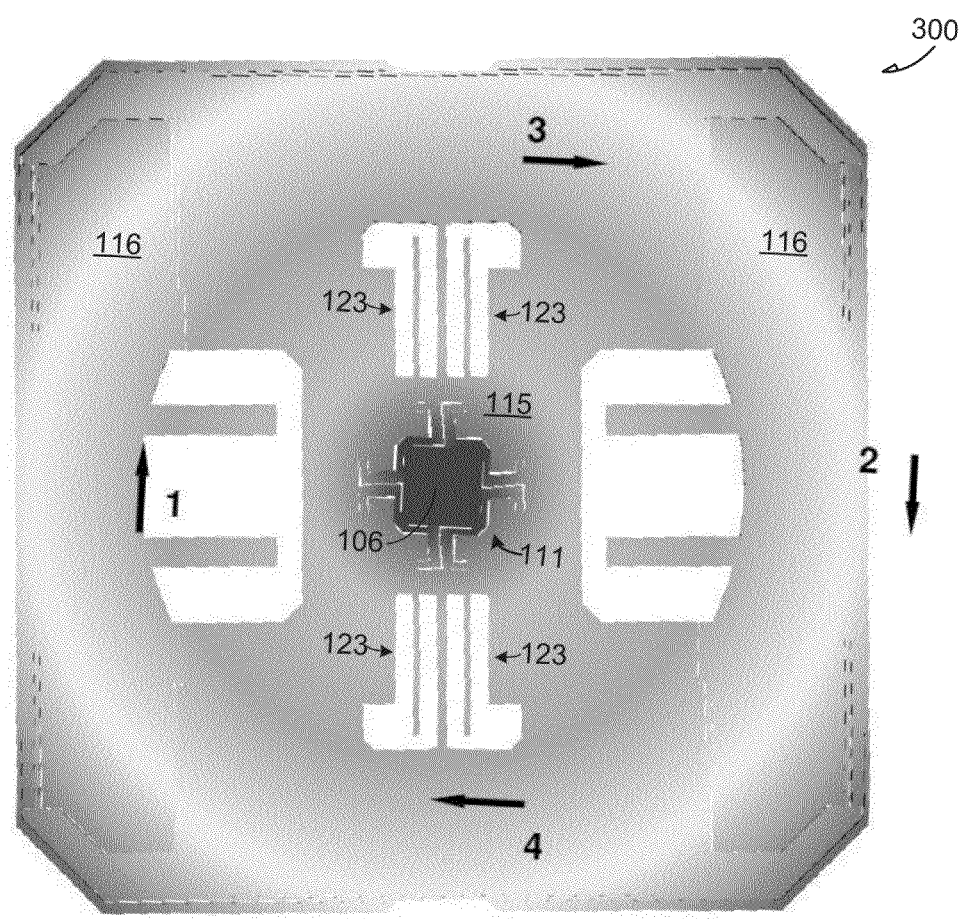
FIG. 3 illustrates generally an example of a 3-axis gyroscope in drive motion.
Figure 4:
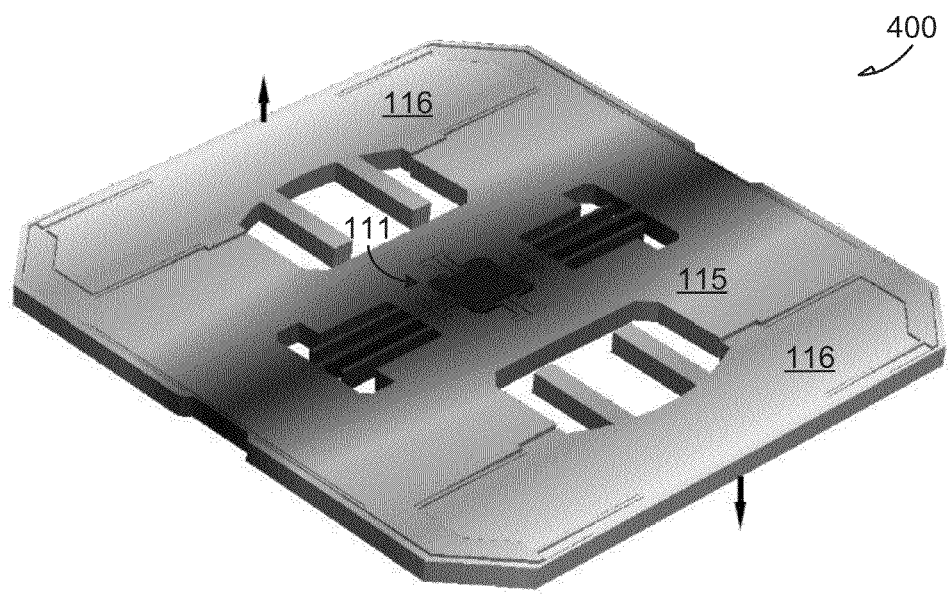
FIG. 4 illustrates generally an example of a 3-axis gyroscope including a single proof-mass during sense motion in response to rotation about the x-axis.
Figure 5:
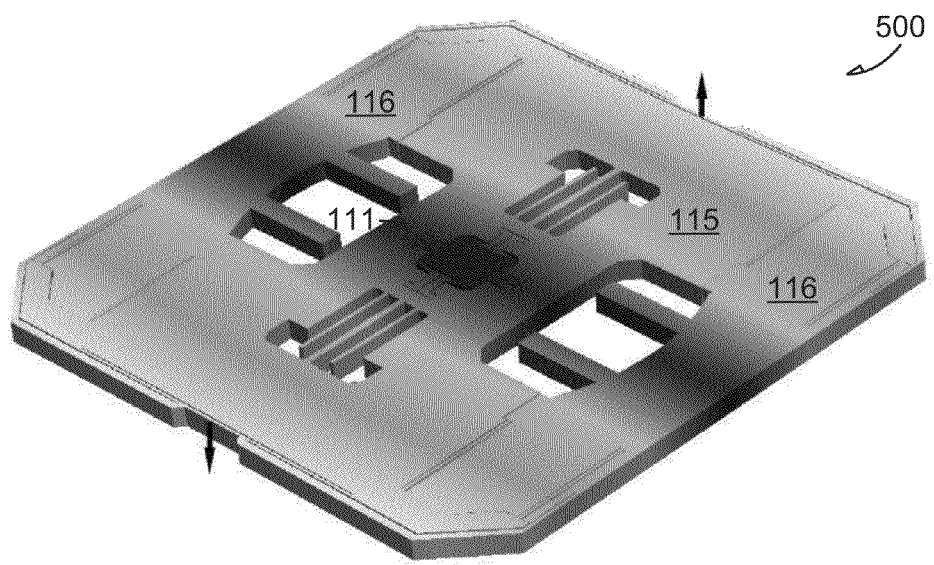
FIG. 5 illustrates generally an example of a 3-axis gyroscope including a single proof-mass during sense motion in response to rotation about the y-axis.

In an example, the single proof-mass can be suspended at its center using a single central anchor (e.g., anchor 106) and a central suspension 111 including symmetric central flexure bearings ("flexures"), such as disclosed in the copending Acar et al., PCT Patent Application Serial No. US2011052006, entitled "FLEXURE BEARING TO REDUCE QUADRATURE FOR RESONATING MICROMACHINED DEVICES," filed on Sep. 16, 2011, which is hereby incorporated by reference in its entirety. The central suspension 111 can allow the single proof-mass to oscillate torsionally about the x, y, and z axes, providing three gyroscope operational modes, including:

(1) Torsional in-plane drive motion about the z-axis (e.g., as illustrated in FIG. 3);

(2) Torsional out-of-plane y-axis gyroscope sense motion about the x-axis (e.g., as illustrated in FIG. 4); and (3) Torsional out-of-plane x-axis gyroscope sense motion about the y-axis (e.g., as illustrated in FIG. 5).

Further, the single proof-mass design can be composed of multiple sections, including, for example, a main proof-mass section 115 and x-axis proof-mass sections 116 symmetric about the y-axis. In an example, drive electrodes 123 can be placed along the y-axis of the main proof-mass section 115. In combination with the central suspension 111, the drive electrodes 123 can be configured to provide a torsional in-plane drive motion about the z-axis, allowing detection of angular motion about the x and y axes.

In an example, the x-axis proof-mass sections 116 can be coupled to the main proof-mass section 115 using z-axis gyroscope flexure bearings 120. In an example, the z-axis gyroscope flexure bearings 120 can allow the x-axis proof-mass sections 116 to oscillate linear anti-phase in the x-direction for the z-axis gyroscope sense motion.

Further, the 3-axis inertial sensor 200 can include z-axis gyroscope sense electrodes 127 configured to detect anti-phase, in-plane motion of the x-axis proof-mass sections 116 along the x-axis.

In an example, each of the drive electrodes 123 and z-axis gyroscope sense electrodes 127 can include moving fingers coupled to one or more proof-mass sections interdigitated with a set of stationary fingers fixed in position (e.g., to the via wafer 103) using a respective anchor, such as anchors 124, 128.

Gyroscope Operational Modes

FIG. 3 illustrates generally an example of a 3-axis gyroscope 300 in drive motion. In an example, the drive electrodes 123 can include a set of moving fingers coupled to the main proof-mass section 115 interdigitated with a set of stationary fingers fixed in position using a first drive anchor 124 (e.g., a raised and electrically isolated portion of the via wafer 103). In an example, the stationary fingers can be configured to receive energy through the first drive anchor 124, and the interaction between the interdigitated moving and stationary fingers of the drive electrodes 123 can be configured to provide an angular force to the single proof-mass about the z-axis.

In the example of FIG. 3, the drive electrodes 123 are driven to rotate the single proof-mass about the z-axis while the central suspension 111 provides restoring torque with respect to the fixed anchor 106, causing the single proof-mass to oscillate torsionally, in-plane about the z-axis at a drive frequency dependent on the energy applied to the drive electrodes 123. In certain examples, the drive motion of the single proof-mass can be detected using the drive electrodes 123.

X-Axis Rate Response

FIG. 4 illustrates generally an example of a 3-axis gyroscope 400 including a single proof-mass during sense motion in response to rotation about the x-axis, the single proof-mass including a main proof-mass section 115, x-axis proof-mass sections 116, and central suspension 111.

In the presence of an angular rate about the x-axis, and in conjunction with the drive motion of the 3-axis gyroscope 400 described in the example of FIG. 3, Coriolis forces in opposite directions along the z-axis can be induced on the x-axis proof-mass sections 116 because the velocity vectors are in opposite directions along the y-axis. Thus, the single proof-mass can be excited torsionally about the y-axis by flexing the central suspension 111. The sense response can be detected using out-of-plane x-axis gyroscope sense electrodes, e.g., formed in the via wafer 103 and using capacitive coupling of the x-axis proof-mass sections 116 and the via wafer 103.

Y-Axis Rate Response

FIG. 5 illustrates generally an example of a 3-axis gyroscope 500 including a single proof-mass during sense motion in response to rotation about the y-axis, the single proof-mass including a main proof-mass section 115, x-axis proof-mass sections 116, and central suspension 111.

In the presence of an angular rate about the y-axis, and in conjunction with the drive motion of the 3-axis gyroscope 400 described in the example of FIG. 3, Coriolis forces in opposite directions along the z-axis can be induced on the main proof-mass section 115 because the velocity vectors are in opposite directions along the x-axis. Thus, the single proof-mass can be excited torsionally about the x-axis by flexing the central suspension 111. The sense response can be detected using out-of-plane y-axis gyroscope sense electrodes, e.g., formed in the via wafer 103 and using capacitive coupling of the main proof-mass section 115 and the via wafer 103.

Z-Axis Rate Response

Figure 6:
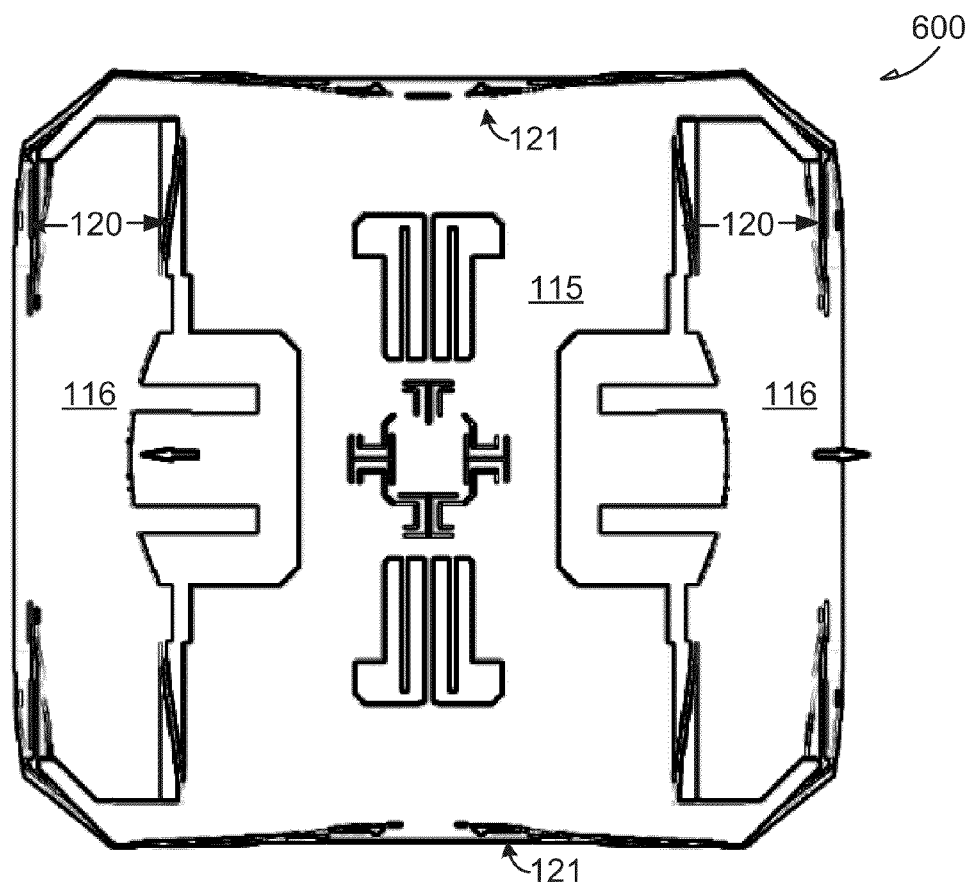
FIG. 6 illustrates generally an example of a 3-axis gyroscope including a single proof-mass during sense motion in response to rotation about the z-axis.

FIG. 6 illustrates generally an example of a 3-axis gyroscope 600 including a single proof-mass during sense motion in response to rotation about the z-axis, the single proof-mass including a main proof-mass section 115, x-axis proof-mass sections 116, central suspension, z-axis flexure bearings 120, and z-axis gyroscope coupling flexure bearings 121.

In the presence of an angular rate about the z-axis, and in conjunction with the drive motion of the 6-axis inertial sensor 400 described in the example of FIG. 3, Coriolis forces in opposite directions along the x-axis can be induced on the x-axis proof-mass sections 116 because the velocity vectors are in opposite directions along the y-axis. Thus, the x-axis proof-mass sections 116 can be excited linearly in opposite directions along the x-axis by flexing the z-axis flexure bearings 120 in the x-direction. Further, the z-axis gyroscope coupling flexure bearings 121 can be used to provide a linear anti-phase resonant mode of the x-axis proof-mass sections 116, which are directly driven by the anti-phase Coriolis forces. The sense response can be detected using in-plane parallel-plate sense electrodes, such as the z-axis gyroscope sense electrodes 127 formed in the device layer 105.

Figure 7:
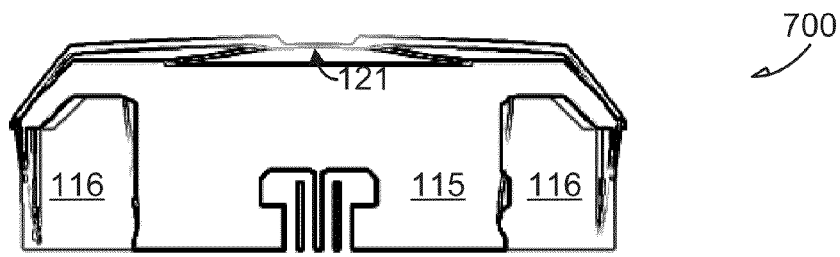
FIGS. 7 and 8 illustrate generally examples of a 3-axis gyroscope including a z-axis gyroscope coupling flexure bearing during anti-phase motion and in-phase motion, respectively.
Figure 8:
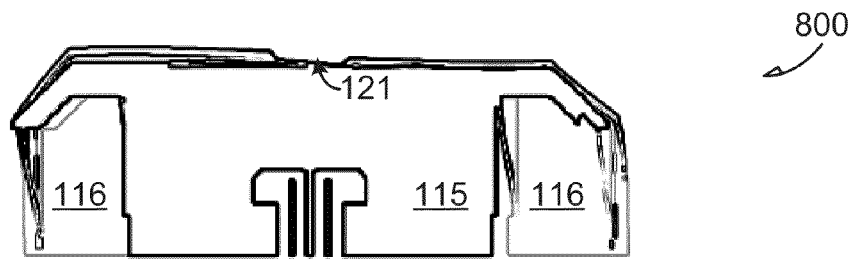

FIGS. 7 and 8 illustrate generally examples of a 3-axis gyroscope 700 including a z-axis gyroscope coupling flexure bearing 121 during anti-phase motion and in-phase motion, respectively. To improve the vibration rejection of the 3-axis gyroscope 700 due to x-axis acceleration, the z-axis gyroscope coupling flexure bearings 121 is configured to suppress in-phase motion of the x-axis proof-mass sections 116.

During the anti-phase motion, the connection beams that connect the two x-axis proof-mass sections 116 to the z-axis gyroscope coupling flexure bearing 121 apply forces in the same direction and the coupling beams undergo a natural bending with low stiffness.

In contrast, during the in-phase motion, the coupling beams of the z-axis gyroscope coupling flexure bearing 121 apply forces in opposite directions on the coupling beams, forcing the coupling beams into a twisting motion with a higher stiffness. Thus, the in-phase motion stiffness and the resonant frequencies are increased, providing better vibration rejection.

Accelerometer Device Structure

Figure 9:
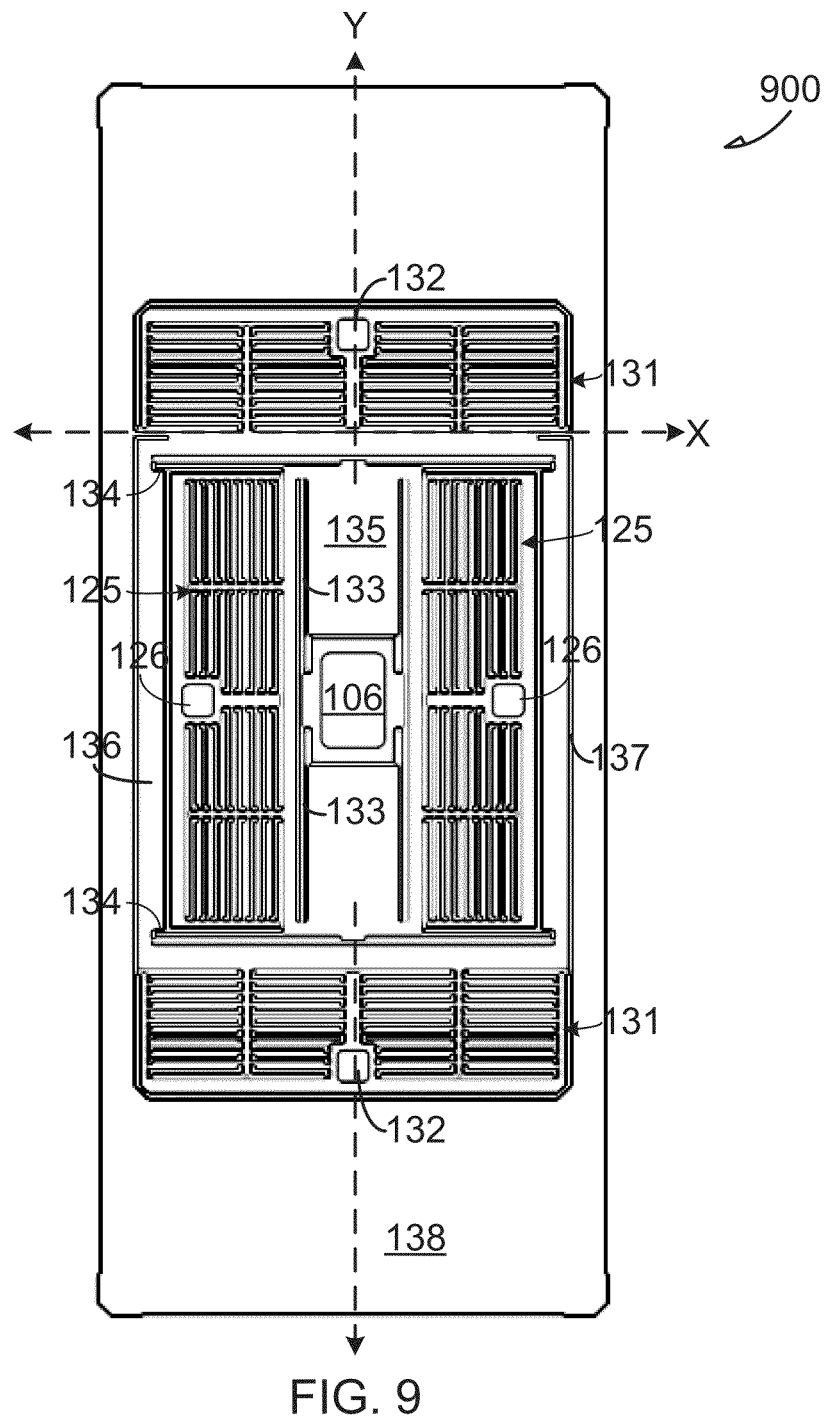
FIG. 9 illustrates generally an example of a 3-axis accelerometer.

FIG. 9 illustrates generally an example of a 3-axis accelerometer 900, such as formed in a single plane of a device layer 105 of a 3-DOF IMU 100. In an example, the 3-axis accelerometer 900 can include a single proof-mass design, providing 3-axis accelerometer operational modes patterned into the device layer 105 of the 3-DOF IMU 100, such as illustrated in the example of FIG. 1.

In an example, the single proof-mass can be suspended at its center to a single central anchor (e.g., anchor 106) using a series of flexure bearings and frames that aim to decouple the response modes and reduce cross-axis sensitivities. In an example, the 3-axis accelerometer 900 can include x-axis flexure bearings 133 configured to couple the anchor 106 to the x-axis frame 135 and allow the x-axis frame 135 to deflect in response to acceleration along the x-axis. Further, the device can include y-axis flexure bearings 134 configured to couple the x-axis frame 135 to the y-axis frame 136 and allow the y-axis frame 136 to deflect with respect to the x-axis frame 135 in response to accelerations along the y-axis, and z-axis flexure bearings 137 configured to couple the y-axis frame 136 to the remainder of the proof-mass 138. The z-axis flexure bearings 137 function as a torsional hinge, allowing the proof-mass to deflect torsionally out-of-plane about the axis that passes through the center of the beams.

Further, the 3-axis accelerometer 900 can include x-axis accelerometer sense electrodes 125 configured to detect in-phase, in-plane x-axis motion of the x-axis frame 135, or y-axis accelerometer sense electrodes 131 configured to detect in-phase, in-plane, y-axis motion of the y-axis frame 136. In an example, each of the x-axis and y-axis accelerometer sense electrodes 125, 131 can include moving fingers coupled to one or more frame sections interdigitated with a set of stationary fingers fixed in position (e.g., to the via wafer 103) using a respective anchor, such as anchors 126, 132.

X-Axis Accelerometer Response

Figure 10:
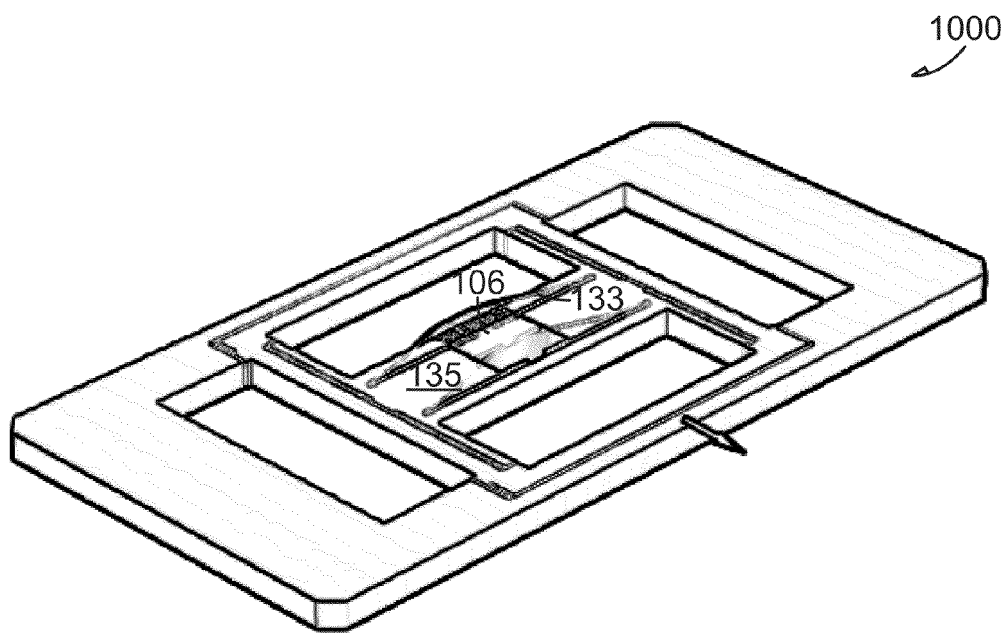
FIG. 10 illustrates generally an example of a 3-axis accelerometer in sense motion in response to an x-axis acceleration.

FIG. 10 illustrates generally an example of a 3-axis accelerometer 1000 in sense motion in response to an x-axis acceleration, the 3-axis accelerometer including a single proof-mass, an anchor 106, x-axis flexure bearings 133, and an x-axis frame 135.

In the presence of an acceleration along the x-axis, the proof-mass, the y-axis frame 136 and the x-axis frame 135 can move in unison with respect to the anchor 106. The resulting motion can be detected using the x-axis accelerometer sense electrodes 125 located on opposite sides of the proof-mass, allowing differential measurement of deflections. In various examples, a variety of detection methods, such as capacitive (variable gap or variable area capacitors), piezoelectric, piezoresistive, magnetic or thermal can be used.

Y-Axis Accelerometer Response

Figure 11:
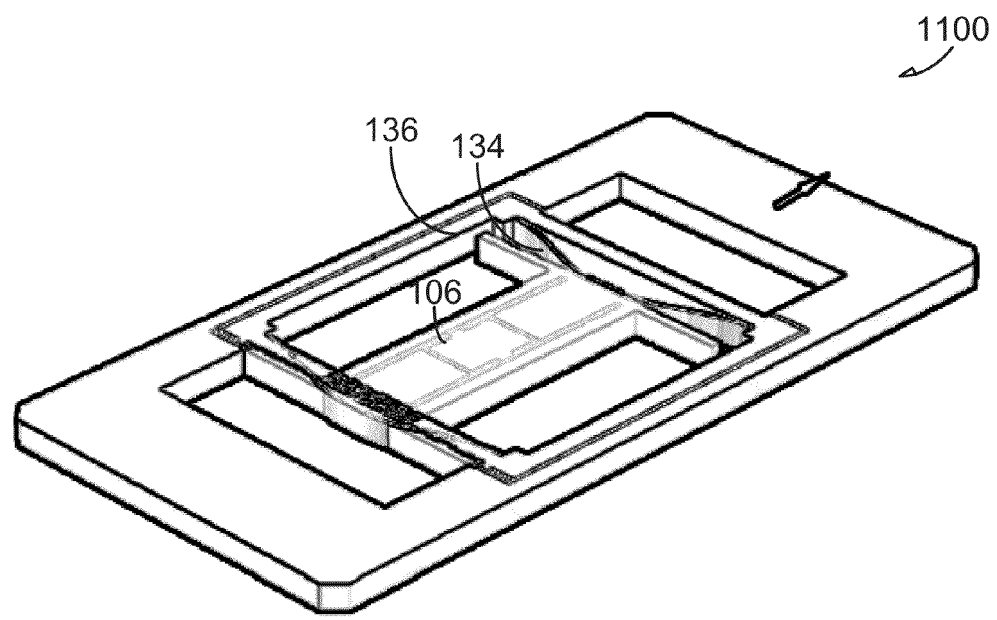
FIG. 11 illustrates generally an example of a 3-axis accelerometer in sense motion in response to a y-axis acceleration.

FIG. 11 illustrates generally an example of a 3-axis accelerometer 1100 in sense motion in response to a y-axis acceleration, the 3-axis accelerometer including a single proof-mass, an anchor 106, y-axis flexure bearings 134, and a y-axis frame 136.

In the presence of an acceleration along the y-axis, the y-axis flexure bearings 134 that connect the y-axis frame 136 to the x-axis frame 135 deflect and allow the y-axis frame 136 to move along the y-axis in unison with the proof-mass, while the x-axis frame remains stationary. The resulting motion can be detected using the y-axis accelerometer sense electrodes 131 located on opposite sides of the proof-mass, allowing differential measurement of deflections. In various examples, a variety of detection methods, such as capacitive (variable gap or variable area capacitors), piezoelectric, piezoresistive, magnetic or thermal can be used.

Z-Axis Accelerometer Response

Figure 12:
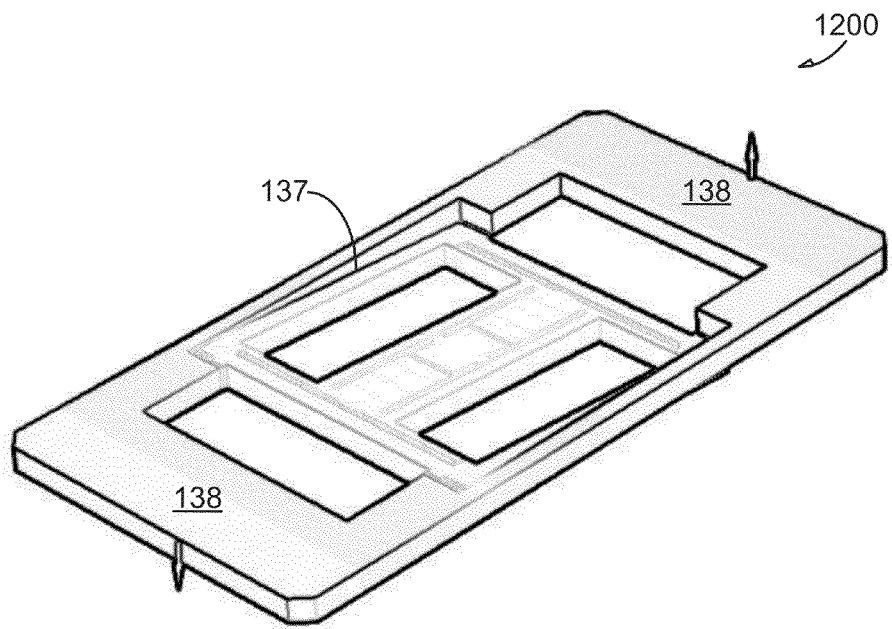
FIG. 12 illustrates generally an example of a 3-axis accelerometer in sense motion in response to a z-axis acceleration.

FIG. 12 illustrates generally an example of a 3-axis accelerometer 1200 in sense motion in response to a z-axis acceleration, the 3-axis accelerometer including a single proof-mass 138, an anchor, and z-axis flexure bearings 137.

In the example of FIG. 12, the x-axis flexure bearings 137 are located such that the axis that passes through the center of the beam is offset from the center of the proof-mass 138. Thus, a mass imbalance is created, so that the portion of the mass that is located further from the pivot line generates a larger inertial moment than the portion located closer, rendering the proof-mass 138 sensitive to z-axis accelerations, deflecting torsionally out-of-plane about the pivot line. The x and y-axis flexure bearings 133, 134 are designed to have high out-of-plane stiffness. Accordingly, they remain stationary during z-axis acceleration.

Figure 13:
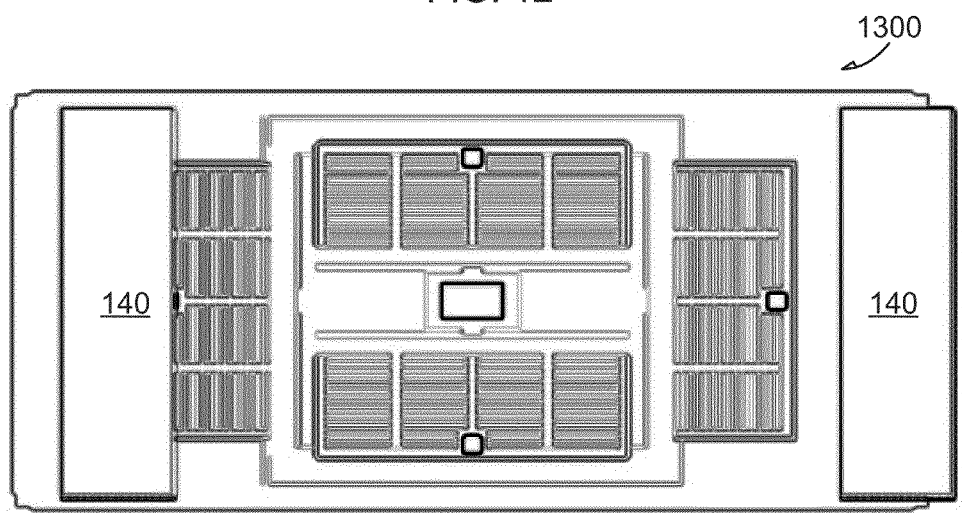
FIG. 13 illustrates generally an example of a system including via wafer electrode placement.

FIG. 13 illustrates generally an example of a system 1300 including via wafer electrode placement. In an example, z-axis accelerometer electrodes 140 can be placed on the via wafer 103 under the device layer 105. The torsional response allows measurement of deflections differentially with only one layer of out-of-plane electrodes. In an example, a variety of detection methods such as capacitive (variable gap or variable area capacitors), piezoelectric, piezoresistive, magnetic or thermal can be employed.

Figure 14:
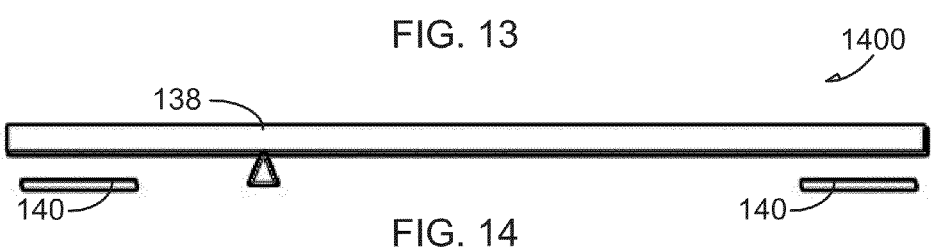
FIG. 14 illustrates generally an example side view of a 3-axis accelerometer including a single proof-mass.

FIG. 14 illustrates generally an example side view of a 3-axis accelerometer 1400 including a single proof-mass, an illustrative "pivot", and z-axis accelerometer electrodes 140.

3+3DOF

Figure 15:
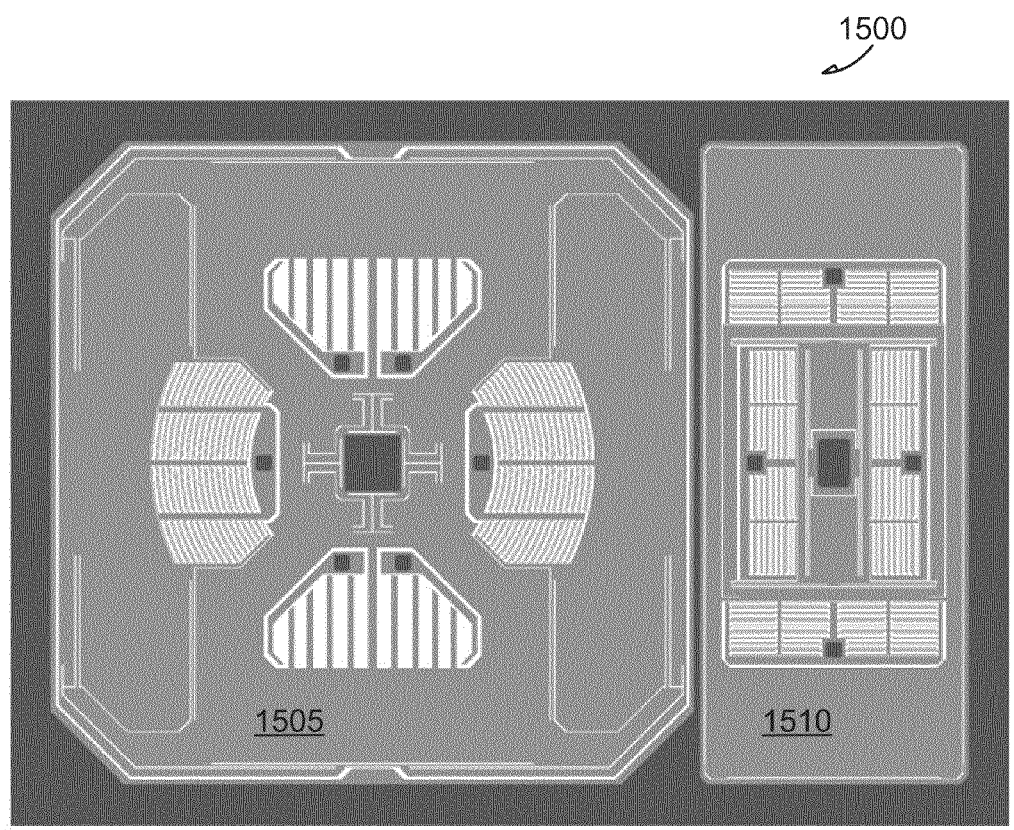
FIG. 15 illustrates generally an example of a 3+3-degrees-of-freedom (3+3DOF) inertial measurement unit (IMU).

FIG. 15 illustrates generally an example of a 3+3-degrees-of-freedom (3+3DOF) inertial measurement unit (IMU) 200 (e.g., a 3-axis gyroscope and a 3-axis accelerometer), such as formed in a single plane of a device layer 105 of an IMU. In an example, the 3+3 DOF can include a 3-axis gyroscope 1505 and a 3-axis accelerometer 1510 on the same wafer.

In this example, each of the 3-axis gyroscope 1505 and the 3-axis accelerometer 1510 have separate proof-masses, though when packaged, the resulting device (e.g., chip-scale package) can share a cap, and thus, the 3-axis gyroscope 1505 and the 3-axis accelerometer 1510 can reside in the same cavity. Moreover, because the devices were formed at similar times and on similar materials, the invention significantly lowers the risk of process variations, reduces the need to separately calibrate the sensors, reduces alignment issues, and allows closer placement than separately bonding the devices near one another.

Further, there is a space savings associated with sealing the resulting device. For example, if a 100 um seal width is required, sharing the cap wafer and reducing the distance between devices allows the overall size of the resulting device to shrink Packaged separately, the amount of space required for the seal width could double.

In an example, die size can be reduced to 2.48×1.8 mm with a 100 um seal width.

Drive and Detection Frequencies

In an example, the drive mode and the three gyroscope sense modes can be located in the 20 kHz range. For open-loop operation, the drive mode can be separated from the sense-modes by a mode separation, such as 100 Hz to 500 Hz, which can determine the mechanical sensitivity of the gyroscopes. To increase sensitivity, the gyroscope operational resonant frequencies can be reduced if the vibration specifications of the application allow. If closed-loop sense operation is implemented, the mode separation can be reduced to increase mechanical sensitivity further.

Quadrature Error Reduction

Figure 16:
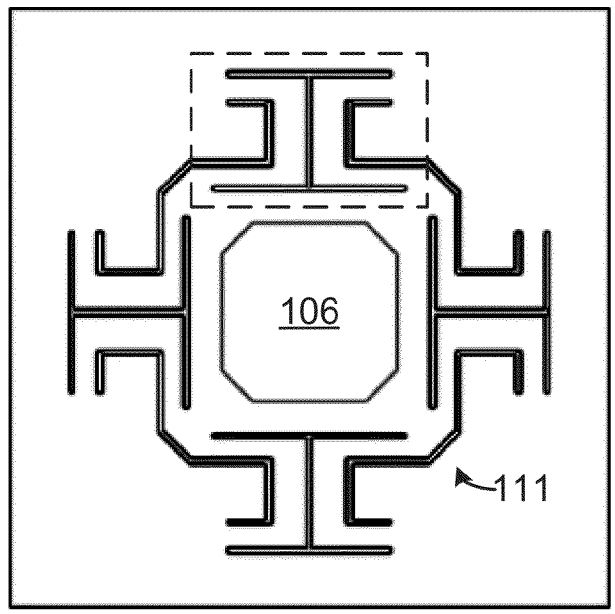
FIG. 16 illustrates generally an example of the central suspension at rest about an anchor.

FIG. 16 illustrates generally an example of the central suspension 111 at rest about an anchor 106, the central suspension 111 including symmetric "C-beams" configured to locally cancel quadrature error. The primary source of quadrature error in micromachined gyroscopes is the DRIE sidewall angle errors, which result in deviation of the etch profile from a straight sidewall. If sidewalls have an angle error, the in-plane drive motion can also cause out-of-plane motion when the skew axis is along beam length. Thus, when skewed compliant beams are located on opposite sides of the drive motion, the resulting out-of-plane deflections cause quadrature error.

Figure 17:
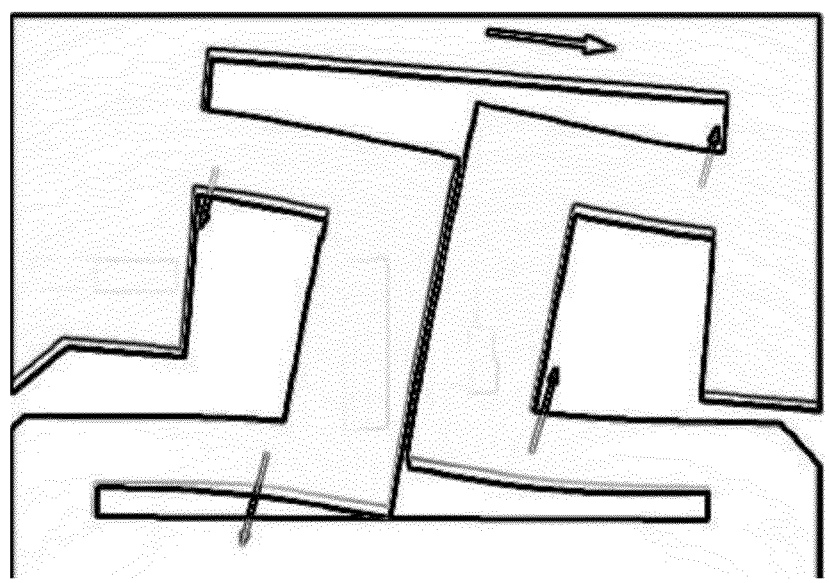
FIG. 17 illustrates generally an example of a portion of the central suspension in drive motion.

FIG. 17 illustrates generally an example of a portion of the central suspension 111 in drive motion. The central suspension 111 utilizes symmetric "C-beams" on each side of the anchor 106. The out-of-plane motion caused by each C-beam on a side is cancelled out by its symmetric counterpart. Thus, the quadrature error induced on each beam can be locally cancelled.

Accelerometer Electrode Structure

FIG. 18 illustrates generally an example of an accelerometer electrode structure 1800 including an electrode stator frame 141 and a proof-mass frame 142 configured to support accelerometer sense electrodes (e.g., x-axis accelerometer sense electrodes 125, etc.) including moving fingers interdigitated with stationary fingers configured to detect motion along one or more axes.

A first major side of the accelerometer electrode structure 1800 can be substantially bound by the electrode stator frame 141 fixed in position (e.g., to a via wafer 103) using an anchor 126 and including a central platform 143 positioned substantially perpendicular to the electrode stator frame 141 and first and second outer branches 144, 145 substantially parallel to at least a portion of the central platform 143.

In an example, the electrode stator frame 141 and a first portion of the central platform 143 can surround and provide support for the anchor 126. A second portion of the central platform, distal from the anchor 126, can narrow, providing increased area for accelerometer sense electrodes (e.g., x-axis accelerometer sense electrodes 125).

A second major side of the accelerometer electrode structure 1800, substantially parallel to the first major side, can be substantially bound by the proof-mass frame 142 including first and second inner branches 148, 149 substantially perpendicular to the proof-mass frame 142 and first and second outer branches 146, 147 substantially parallel to the first or second inner branches 148, 149.

In the example of FIG. 18, the first and second outer branches 146, 147 of the proof-mass frame 142 can surround the first and second outer branches 144, 145 of the electrode stator frame 141 on first and second minor sides of the accelerometer electrode 1800 (e.g., the top and bottom in FIG. 18). In an example, to reduce proof-mass weight, the first and second outer branches 146, 147 of the proof-mass frame 142 can be excluded.

FIG. 19 illustrates generally an example of an accelerometer electrode structure 1900 including an electrode stator frame 151 and a proof-mass frame 152 configured to support accelerometer sense electrodes (e.g., x-axis accelerometer sense electrodes 125, etc.) including moving fingers interdigitated with stationary fingers configured to detect motion along one or more axes.

The present inventors have recognized, among other things, that shifting mass from the electrode stator frame 151 to the proof-mass frame 152 can improve the shock and vibration resistance of the accelerometer electrode structure 1900 or an associated inertial sensor. Further, the present inventors have recognized that providing a wider central platform 153 can allow independent or asymmetric anchor 126 placement on each or either side of the associated inertial sensor to, for example, to compensate for die deformation, such as from packaging stress, to improve temperature performance, etc.

Similar to the example illustrated in FIG. 18, a first major side of the accelerometer electrode structure 1900 can be substantially bound by an electrode stator frame 151 fixed in position (e.g., to a via wafer 103) using the anchor 126 and including a central platform 153 positioned substantially perpendicular to the electrode stator frame 151 and first and second inner branches 154, 155 substantially parallel to at least a portion of the central platform 153.

In an example, the electrode stator frame 151 and the central platform 153 can surround and provide support for the anchor 126. In contrast to the example illustrated in FIG. 18, the central platform 152 of FIG. 19 can be wider than the central platform 142 of FIG. 18, providing a wider platform to locate the anchor 126, in certain examples, allowing independent or adjustable anchor 126 positions on each or either side of the inertial sensor. In certain examples, independent or adjustable anchor positions for one or both sides of the inertial sensor can improve temperature performance of the inertial sensor, depending on, for example, the position of the inertial sensor on a die.

A second major side of the accelerometer electrode structure 1900, substantially parallel to the first major side, can be substantially bound by a proof-mass frame 152 including first and second inner branches 158, 159 substantially perpendicular to the proof-mass frame 152 and first and second outer branches 156, 157 substantially parallel to the first or second inner branches 158, 159.

In the example of FIG. 19, the first and second inner branches 154, 155 of the electrode stator frame 151 and the first and second inner branches 158, 159 of the proof-mass frame 152 can be positioned closer to the central platform 153 than the example illustrated in FIG. 18. In an example, shifting these branches closer to the central platform 153 can allow a shift of a portion of the electrode mass to the proof-mass side of the accelerometer electrode structure 1900, minimizing the mass of the electrode stator 151 to improve shock or vibration resistance or to increase the lower or lowest resonant frequencies of the capacitive accelerometer sense electrodes, such as illustrated in FIG. 24.

Figure 20:
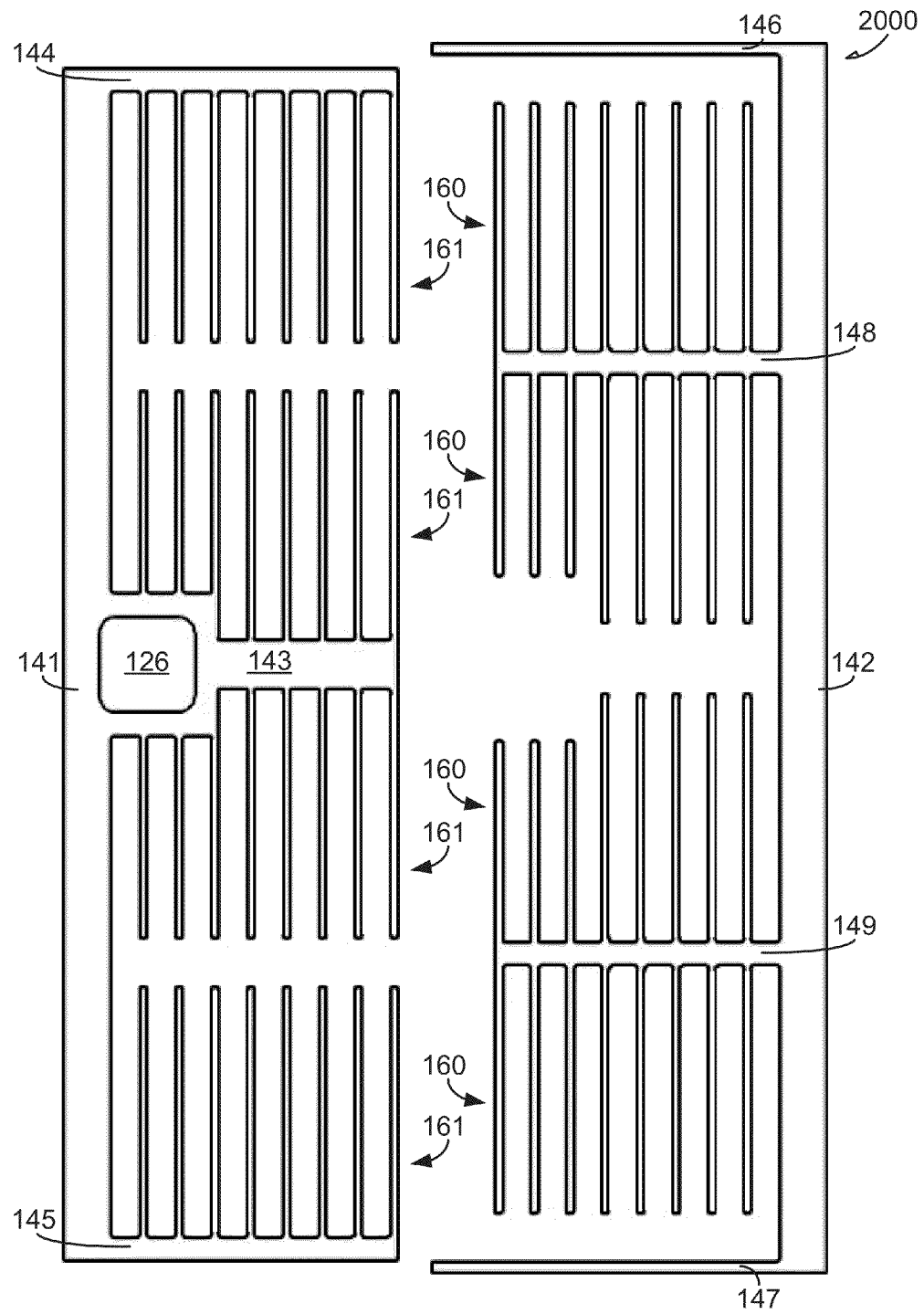

FIG. 20 illustrates generally an example of an accelerometer electrode structure 2000, such as that illustrated in the example of FIG. 18. In this example, the electrode stator frame 141 and the proof-mass frame 142 are separated, separately illustrating moving fingers 160 decoupled from stationary fingers 161.

Figure 21:
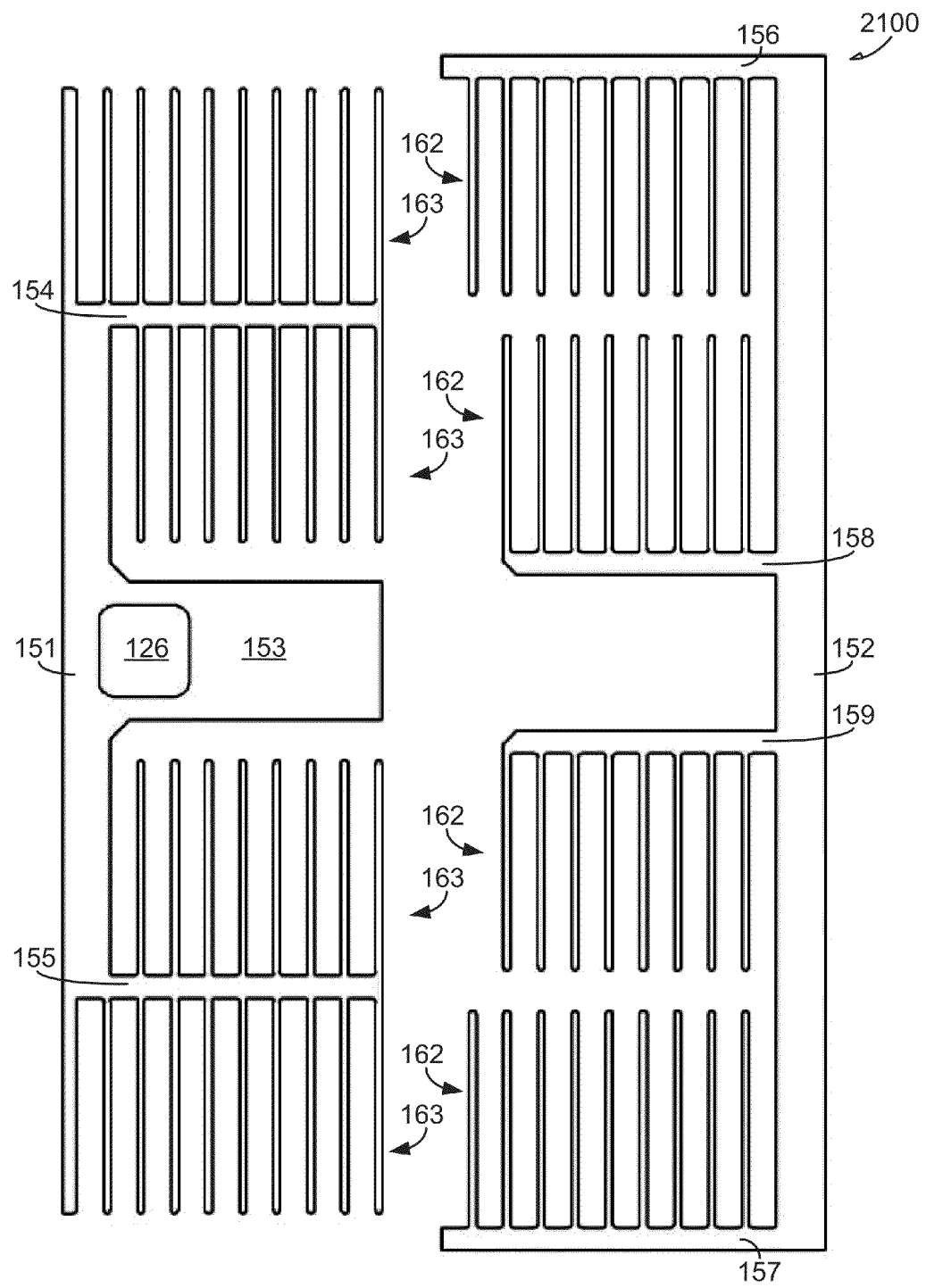

FIG. 21 illustrates generally an example of an accelerometer electrode structure 2100, such as that illustrated in the example of FIG. 19. In this example, the electrode stator frame 151 and the proof-mass frame 152 are separated, separately illustrating moving fingers 162 decoupled from stationary fingers 163. Although the central platform 153 illustrated in FIGS. 19 and 21 is wider than the central platform 143 illustrated in FIGS. 18 and 20, the reduced mass electrode stator frame 151 can provide for an additional sense electrodes or additional sense electrode area.

Figure 22:
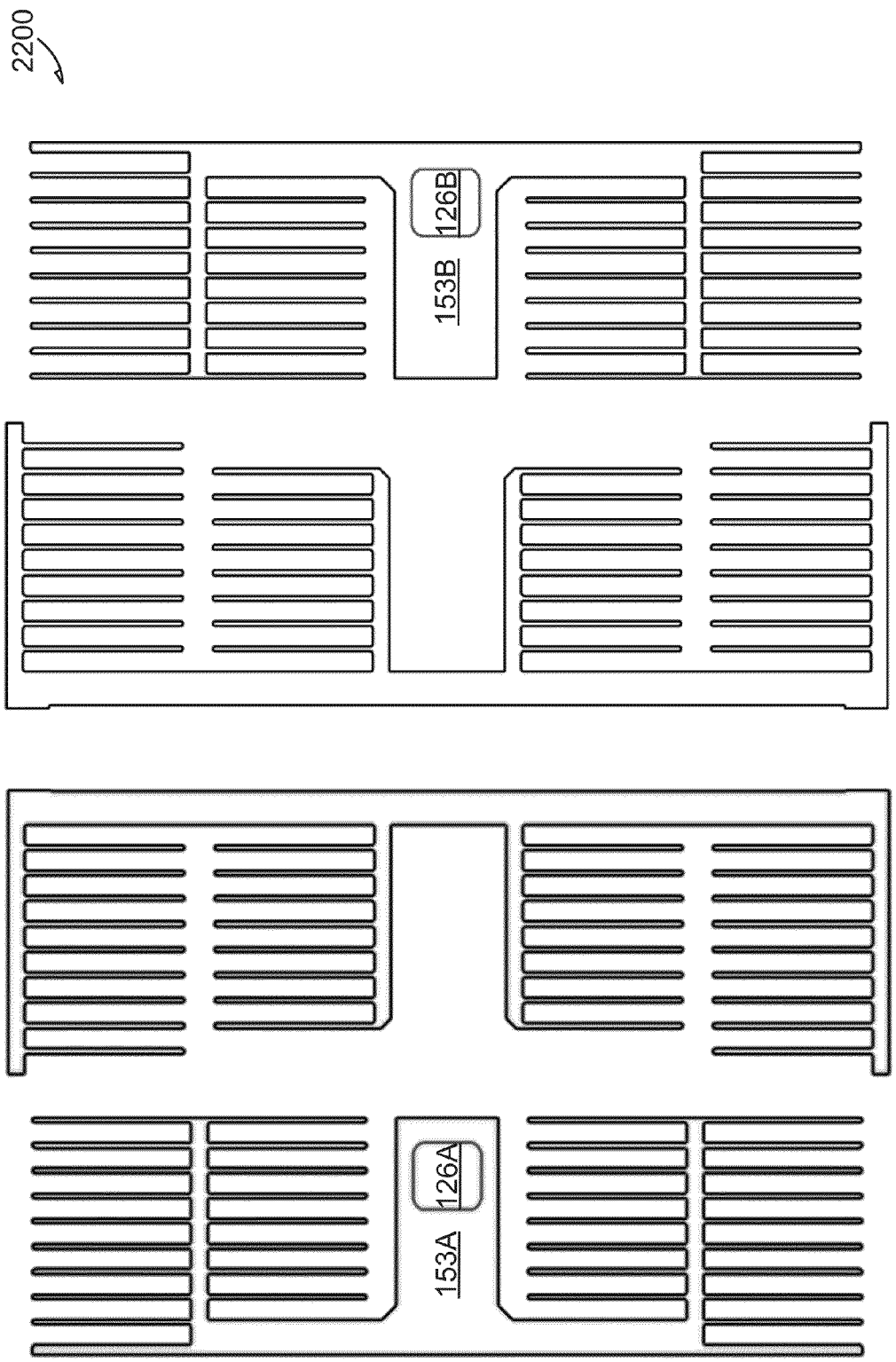

FIG. 22 illustrates generally an example of a decoupled left and right accelerometer electrode structure 2200 including a left anchor 126A, a left central platform 153A, a right anchor 126B, and a right central platform 153B. In this example, the left and right anchors 126A, 126B are positioned asymmetrically to optimize or improve temperature performance. In certain examples, the left and right anchors 126A, 126B can be positioned independently or asymmetrically to compensate for non-centered placement on the die or asymmetric die deformation, such as from packaging stress. In certain examples, placement of the anchors towards the stator side versus the proof-mass side can be specifically configured to compensate for temperature performance, to adjust for offset inertial sensor placement on a die, to adjust for inertial sensor packaging, or one or more other factors.

FIG. 23 illustrates generally an example of a lowest out-of-plane resonant mode of an electrode stator frame 141, such as that illustrated in the examples of FIGS. 18 and 20.

FIG. 24 illustrates generally an example of a lowest out-of-plane resonant mode of an electrode stator frame 151, such as that illustrated in the examples of FIGS. 19 and 21.

The resonant modes of FIGS. 23 and 24 illustrate generally that the lowest out-of-plane resonant mode of the electrode stator frame 151 of the example of FIG. 24 is higher than the lowest out-of-plane resonant mode of the electrode stator frame 141 of the example of FIG. 23.

Additional Notes and Examples

In Example 1, an inertial sensor includes a single proof-mass formed in an x-y plane of a device layer, the single proof-mass including a single, central anchor configured to suspend the single proof-mass above a via wafer, first and second electrode stator frames formed in the x-y plane of the device layer on respective first and second sides of the inertial sensor, the first and second electrode stator frames symmetric about the single, central anchor, and each separately including a central platform and an anchor configured to fix the central platform to the via wafer, wherein the anchors for the first and second electrode stator frames are asymmetric along the central platforms with respect to the single, central anchor.

In Example 2, the first and second electrode stator frames of Example 1 optionally includes first and second inner branches and a plurality of stationary fingers coupled to the first and second inner branches.

In Example 3, the first inner branch of any one or more of Examples 1-2 is substantially parallel to the second inner branch.

In Example 4, the first and second inner branches of the first and second electrode stator frames are substantially parallel to the central platforms of the first and second electrode stator frames.

In Example 5, the central platforms of the first and second electrode stator frames of any one or more of Examples 1-4 are optionally symmetric about the single, central anchor.

In Example 6, any one or more of Examples 1-5 optionally includes first and second proof-mass frames formed in the x-y plane of the device layer, each coupled to the single proof-mass and including first and second inner branches about and substantially parallel to the central platform, first and second outer branches, and a plurality of moving fingers coupled to the first and second inner and outer branches.

In Example 7, the first and second electrode stator frames of any one or more of Examples 1-6 optionally have a first mass, wherein the first and second proof-mass frames of any one or more of Examples 1-6 optionally have a second mass, and wherein the first mass is optionally less than the second mass.

In Example 8, at least a portion of the plurality of stationary fingers of any one or more of Examples 1-7 are optionally interdigitated with at least a portion of the plurality of moving fingers.

In Example 9, the stationary fingers of any one or more of Examples 1-8 are optionally substantially perpendicular to the first and second inner branches of the first and second electrode stator frames, wherein the moving fingers are optionally substantially perpendicular to the first and second inner and outer branches of the first and second proof-mass frames.

In Example 10, any one or more of Examples 1-9 optionally include a single proof-mass 3-axis accelerometer including the single proof-mass and separate x, y, and z-axis flexure bearings, wherein the x and y-axis flexure bearings are optionally symmetric about the single, central anchor and the z-axis flexure is optionally not symmetric about the single, central anchor.

In Example 11, the 3-axis accelerometer of any one or more of Examples 1-10 optionally includes in-plane x and y-axis accelerometer sense electrodes symmetric about the single, central anchor and out-of-plane z-axis accelerometer sense electrodes, wherein the in-plane x-axis accelerometer sense electrodes optionally include the first and second electrode stator frames.

In Example 12, any one or more of Examples 1-11 optionally includes a single proof-mass 3-axis gyroscope formed in the x-y plane adjacent the 3-axis accelerometer, the single proof-mass 3-axis gyroscope including a main proof-mass section suspended about a single, central anchor, the main proof-mass section including a radial portion extending outward towards an edge of the 3-axis gyroscope, a central suspension system configured to suspend the 3-axis gyroscope from the single, central anchor, and a drive electrode including a moving portion and a stationary portion, the moving portion coupled to the radial portion, wherein the drive electrode and the central suspension system are configured to oscillate the 3-axis gyroscope about a z-axis normal to the x-y plane at a drive frequency.

In Example 13, any one or more of Examples 1-12 optionally includes a cap wafer bonded to a first surface of the device layer, wherein the via wafer is optionally bonded to a second surface of the device layer, wherein the cap wafer and the via wafer are optionally configured to encapsulate the single proof-mass 3-axis gyroscope and the single proof-mass 3-axis accelerometer in the same cavity.

In Example 14, the single, central anchor of any one or more of Examples 1-13 is optionally not centered on the via wafer, wherein the anchors for the first and second electrode stator frames are optionally asymmetric along the central platforms with respect to the single, central anchor to improve temperature performance associated with thermal deformation.

In Example 15, any one or more of Examples 1-14 optionally includes a single proof-mass formed in an x-y plane of a device layer, the single proof-mass including a single, central anchor configured to suspend the single proof-mass above a via wafer, x-axis flexure bearings symmetric about the single, central anchor, a first proof-mass frame, a first electrode stator frame on a first side of the single, central anchor, the first electrode stator frame including a first central platform, first and second inner branches, a plurality of stationary fingers coupled to the first and second inner branches, and a first anchor configured to fix the first electrode stator frame to the via wafer at a first position along the first central platform, and a second electrode stator frame on a second side of the single, central anchor, the second electrode stator frame including a second central platform, third and fourth inner branches, a plurality of stationary fingers coupled to the third and fourth inner branches, and a second anchor configured to fix the second electrode stator frame to the via wafer at a second position along the second central platform, wherein the first position along the first central platform and the second position along the second central platform are asymmetric with respect to the single, central anchor.

In Example 16, the first and second electrode stator frames of any one or more of Examples 1-15 are optionally symmetric about the single, central anchor.

In Example 17, the inertial sensor of any one or more of claims 1-16 optionally include first and second proof-mass frames formed in the x-y plane of the device layer, each coupled to the single proof-mass and including first and second inner branches about and substantially parallel to the first and second central platforms, first and second outer branches, and a plurality of moving fingers coupled to the first and second inner and outer branches. At least a portion of the plurality of stationary fingers of any one or more of Examples 1-16 optionally are interdigitated with at least a portion of the plurality of moving fingers.

In Example 18, a method can include suspending a single proof-mass formed in an x-y plane of a device layer above a via wafer using a single, central anchor, asymmetrically, with respect to the single, central anchor, anchoring first and second electrode stator frames along central platforms of the first and second electrode stator frames formed in the x-y plane of the device layer to the via wafer, wherein the first and second electrode stator frames are symmetric about the single, central anchor, and detecting acceleration between the single proof-mass and the first and second electrode stator frames.

In Example 19, the suspending the single proof-mass of any one or more of Examples 1-18 optionally includes suspending a single proof-mass 3-axis accelerometer having symmetric x and y-axis flexure bearings about the single, central anchor and asymmetric z-axis flexure bearings about the single, central anchor.

In Example 20, the asymmetrically anchoring the first and second electrode stator frames along the central platforms with respect to the single, central anchor of any one or more of Examples 1-19 optionally includes to compensate for package deformation and improve temperature performance of an inertial sensor associated with the single proof-mass.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An inertial sensor, comprising:
a single proof-mass formed in an x-y plane of a device layer, the single proof-mass including a single, central anchor configured to suspend the single proof-mass above a via wafer;

first and second electrode stator frames formed in the x-y plane of the device layer on respective first and second sides of the inertial sensor, the first and second electrode stator frames symmetric about the single, central anchor, and each separately including:
a central platform; and
an anchor configured to fix the central platform to the via wafer;
wherein the anchors for the first and second electrode stator frames are positioned asymmetrically along the central platforms with respect to the single, central anchor.

2. The inertial sensor of claim 1, wherein the first and second electrode stator frames include:
first and second inner branches; and
a plurality of stationary fingers coupled to the first and second inner branches.

3. The inertial sensor of claim 2, wherein the first inner branch is substantially parallel to the second inner branch.

4. The inertial sensor of claim 3, wherein the first and second inner branches of the first and second electrode stator frames are substantially parallel to the central platforms of the first and second electrode stator frames.

5. The inertial sensor of claim 4, wherein the central platforms of the first and second electrode stator frames are symmetric about the single, central anchor.

6. The inertial sensor of claim 2, including:
first and second proof-mass frames formed in the x-y plane of the device layer, each coupled to the single proof-mass and including:
first and second inner branches about and substantially parallel to the central platforms;
first and second outer branches; and
a plurality of moving fingers coupled to the first and second inner and outer branches.

7. The inertial sensor of claim 6, wherein the first and second electrode stator frames have a first mass, wherein the first and second proof-mass frames have a second mass, and wherein the first mass is less than the second mass.

8. The inertial sensor of claim 6, wherein at least a portion of the plurality of stationary fingers are interdigitated with at least a portion of the plurality of moving fingers.

9. The inertial sensor of claim 6, wherein the stationary fingers are substantially perpendicular to the first and second inner branches of the first and second electrode stator frames; and
wherein the moving fingers are substantially perpendicular to the first and second inner and outer branches of the first and second proof-mass frames.

10. The inertial sensor of claim 1, including:
a single proof-mass 3-axis accelerometer including the single proof-mass and separate x, y, and z-axis flexure bearings; and
wherein the x and y-axis flexure bearings are symmetric about the single, central anchor and the z-axis flexure is not symmetric about the single, central anchor.

11. The inertial sensor of claim 10, wherein the 3-axis accelerometer includes in-plane x and y-axis accelerometer sense electrodes symmetric about the single, central anchor and out-of-plane z-axis accelerometer sense electrodes; and
wherein the in-plane x-axis accelerometer sense electrodes include the first and second electrode stator frames.

12. The inertial sensor of claim 11, including:
a single proof-mass 3-axis gyroscope formed in the x-y plane adjacent the 3-axis accelerometer, the single proof-mass 3-axis gyroscope including:
a main proof-mass section suspended about a single, central anchor, the main proof-mass section including a radial portion extending outward towards an edge of the 3-axis gyroscope;
a central suspension system configured to suspend the 3-axis gyroscope from the single, central anchor; and
a drive electrode including a moving portion and a stationary portion, the moving portion coupled to the radial portion, wherein the drive electrode and the central suspension system are configured to oscillate the 3-axis gyroscope about a z-axis normal to the x-y plane at a drive frequency.

13. The apparatus of claim 11, including:
a cap wafer bonded to a first surface of the device layer; and
wherein the via wafer is bonded to a second surface of the device layer, wherein the cap wafer and the via wafer are configured to encapsulate the single proof-mass 3-axis gyroscope and the single proof-mass 3-axis accelerometer in the same cavity.

14. The inertial sensor of claim 1, wherein the single, central anchor is not centered on the via wafer; and
wherein the anchors for the first and second electrode stator frames are asymmetric along the central platforms with respect to the single, central anchor to improve temperature performance associated with thermal deformation.

15. An inertial sensor, comprising:
a single proof-mass formed in an x-y plane of a device layer, the single proof-mass including:
a single, central anchor configured to suspend the single proof-mass above a via wafer;
x-axis flexure bearings symmetric about the single, central anchor;
a first proof-mass frame;
a first electrode stator frame on a first side of the single, central anchor, the first electrode stator frame including:
a first central platform;
first and second inner branches;
a plurality of stationary fingers coupled to the first and second inner branches; and
a first anchor configured to fix the first electrode stator frame to the via wafer at a first position along the first central platform; and
a second electrode stator frame on a second side of the single, central anchor, the second electrode stator frame including:
a second central platform;
third and fourth inner branches;
a plurality of stationary fingers coupled to the third and fourth inner branches; and
a second anchor configured to fix the second electrode stator frame to the via wafer at a second position along the second central platform; and
wherein the first position along the first central platform and the second position along the second central platform are asymmetric with respect to the single, central anchor.

16. The inertial sensor of claim 15, wherein the first and second electrode stator frames are symmetric about the single, central anchor.

17. The inertial sensor of claim 16, including:
first and second proof-mass frames formed in the x-y plane of the device layer, each coupled to the single proof-mass and including:
first and second inner branches about and substantially parallel to the first and second central platforms;
first and second outer branches; and a plurality of moving fingers coupled to the first and second inner and outer branches; and wherein at least a portion of the plurality of stationary fingers are interdigitated with at least a portion of the plurality of moving fingers.

* * * * *